(12) United States Patent
Kriese et al.

(10) Patent No.: US 8,104,822 B2
(45) Date of Patent: Jan. 31, 2012

(54) BLINDS FOR VEHICLES

(75) Inventors: Olaf Kriese, Coburg (DE); Markus Schultz, Nürnberg (DE)

(73) Assignee: Brose Fahrzeugteile GmbH & Co., KG, Coburg, Coburg (DE)

( * ) Notice: Subject to any disclaimer, the term of this patent is extended or adjusted under 35 U.S.C. 154(b) by 587 days.

(21) Appl. No.: 12/224,518

(22) PCT Filed: Sep. 28, 2007

(86) PCT No.: PCT/EP2007/060292
§ 371 (c)(1),
(2), (4) Date: Aug. 27, 2008

(87) PCT Pub. No.: WO2008/037785
PCT Pub. Date: Apr. 3, 2008

(65) Prior Publication Data
US 2009/0101291 A1    Apr. 23, 2009

(30) Foreign Application Priority Data

Sep. 29, 2006  (DE) .......................... 10 2006 047 359
Dec. 5, 2006   (DE) .......................... 10 2006 058 360

(51) Int. Cl.
B60J 3/02    (2006.01)
E05F 15/16   (2006.01)
B60J 1/20    (2006.01)
E06B 9/66    (2006.01)
E06B 9/70    (2006.01)

(52) U.S. Cl. ..................... 296/138; 49/349; 160/370.21; 296/97.4; 296/97.8

(58) Field of Classification Search .................. 49/349, 49/352; 160/370.21, 370.22, 370.23; 296/97.1, 296/97.2, 97.4, 97.8, 138, 146.2, 146.7, 142, 296/143
See application file for complete search history.

(56) References Cited

U.S. PATENT DOCUMENTS 1,486,962 A * 3/1924 Heintz ............................ 16/211
3,022,064 A * 2/1962 Russell ............................ 49/26
(Continued)

FOREIGN PATENT DOCUMENTS
DE         3345503 A1 *  6/1985
(Continued)

OTHER PUBLICATIONS

German Search Report dated Sep. 1, 2008 for Application No. 10 2006 058 360.4, 4 sheets.
(Continued)

*Primary Examiner* — Glenn Dayoan
*Assistant Examiner* — Paul Chenevert
(74) *Attorney, Agent, or Firm* — Christie, Parker & Hale LLP

(57) ABSTRACT

A vehicle roller blind or a sunshield roller blind for motor vehicles includes a roller blind web which is connected to a thrust element, which is rigid in compression and/or bending-resistant, for tensioning the roller blind web, and having an adjusting device which actuates the thrust element, which is embodied in the manner of a single-strand cable window lifter and which is at least partially encapsulated together with the thrust element. The thrust element and the adjusting device are arranged in a housing which holds the thrust element and the adjusting device and which comprises a drive housing for the roller blind drive and a preferably tubular guide channel which holds the thrust element and the flexible traction means.

24 Claims, 28 Drawing Sheets

U.S. PATENT DOCUMENTS

| | | | | |
|---|---|---|---|---|
| 3,834,080 | A * | 9/1974 | Lystad | 49/348 |
| 4,174,865 | A * | 11/1979 | Doveinis | 296/146.2 |
| 4,335,541 | A * | 6/1982 | Kazewych | 49/360 |
| 4,442,632 | A * | 4/1984 | Greco et al. | 49/352 |
| 4,637,166 | A * | 1/1987 | Ujihara | 49/352 |
| 4,685,248 | A * | 8/1987 | Hammond | 49/352 |
| 4,850,084 | A | 7/1989 | Iwasaki | |
| 5,165,188 | A * | 11/1992 | Tsiros | 49/63 |
| 5,309,678 | A * | 5/1994 | Adachi | 49/352 |
| 5,505,022 | A | 4/1996 | Shibata et al. | |
| 5,645,119 | A * | 7/1997 | Caruso | 160/370.23 |
| 5,746,469 | A * | 5/1998 | Nonaka | 296/97.7 |
| 6,161,337 | A | 12/2000 | Morando | 49/352 |
| 6,227,601 | B1 * | 5/2001 | LaFrance | 296/97.4 |
| 6,347,825 | B2 * | 2/2002 | Seel et al. | 296/97.8 |
| 6,349,986 | B1 * | 2/2002 | Seel et al. | 296/37.16 |
| 6,407,365 | B1 * | 6/2002 | De Prete, III | 219/203 |
| 6,536,829 | B2 * | 3/2003 | Schlecht et al. | 296/97.4 |
| 6,668,902 | B2 * | 12/2003 | Bong | 160/370.22 |
| 7,896,058 | B2 * | 3/2011 | Hansen | 160/370.22 |
| 7,918,490 | B2 * | 4/2011 | Kriese et al. | 296/97.4 |
| 2001/0022218 | A1 | 9/2001 | Schlecht et al. | |
| 2002/0060469 | A1 * | 5/2002 | Schlecht et al. | 296/97.4 |
| 2002/0089209 | A1 * | 7/2002 | Kobayashi et al. | 296/97.4 |
| 2002/0134021 | A1 * | 9/2002 | Dobson | 49/349 |
| 2008/0000160 | A1 * | 1/2008 | Hernandez et al. | 49/352 |
| 2009/0078379 | A1 * | 3/2009 | Hansen | 160/265 |

FOREIGN PATENT DOCUMENTS

| | | | |
|---|---|---|---|
| DE | 3415930 A1 * | 10/1985 | |
| DE | 195 09 205 A1 | 9/1995 | |
| DE | 201 12 948 U1 | 11/2001 | |
| DE | 20 2004 014 652 U1 | 4/2006 | |
| DE | 10 2006 047 359 A1 | 6/2008 | |
| EP | 607588 A1 * | 7/1994 | |
| EP | 1 123 824 A2 | 8/2001 | |
| FR | 2621645 A1 * | 4/1989 | |

OTHER PUBLICATIONS

International Search Report, dated Jan. 30, 2008, corresponding to PCT/EP2007/060292.

* cited by examiner

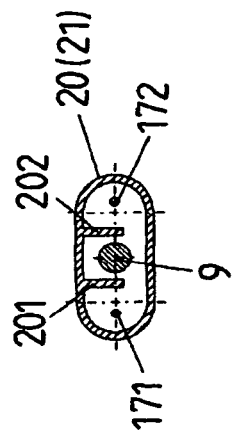
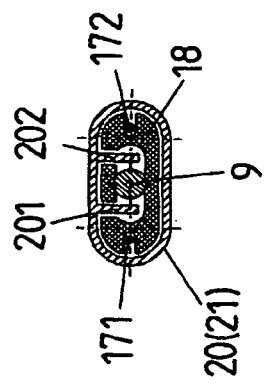
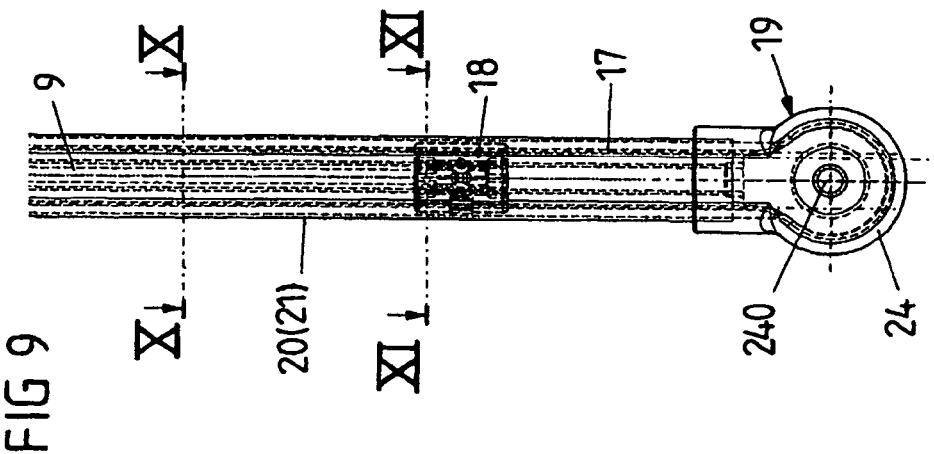

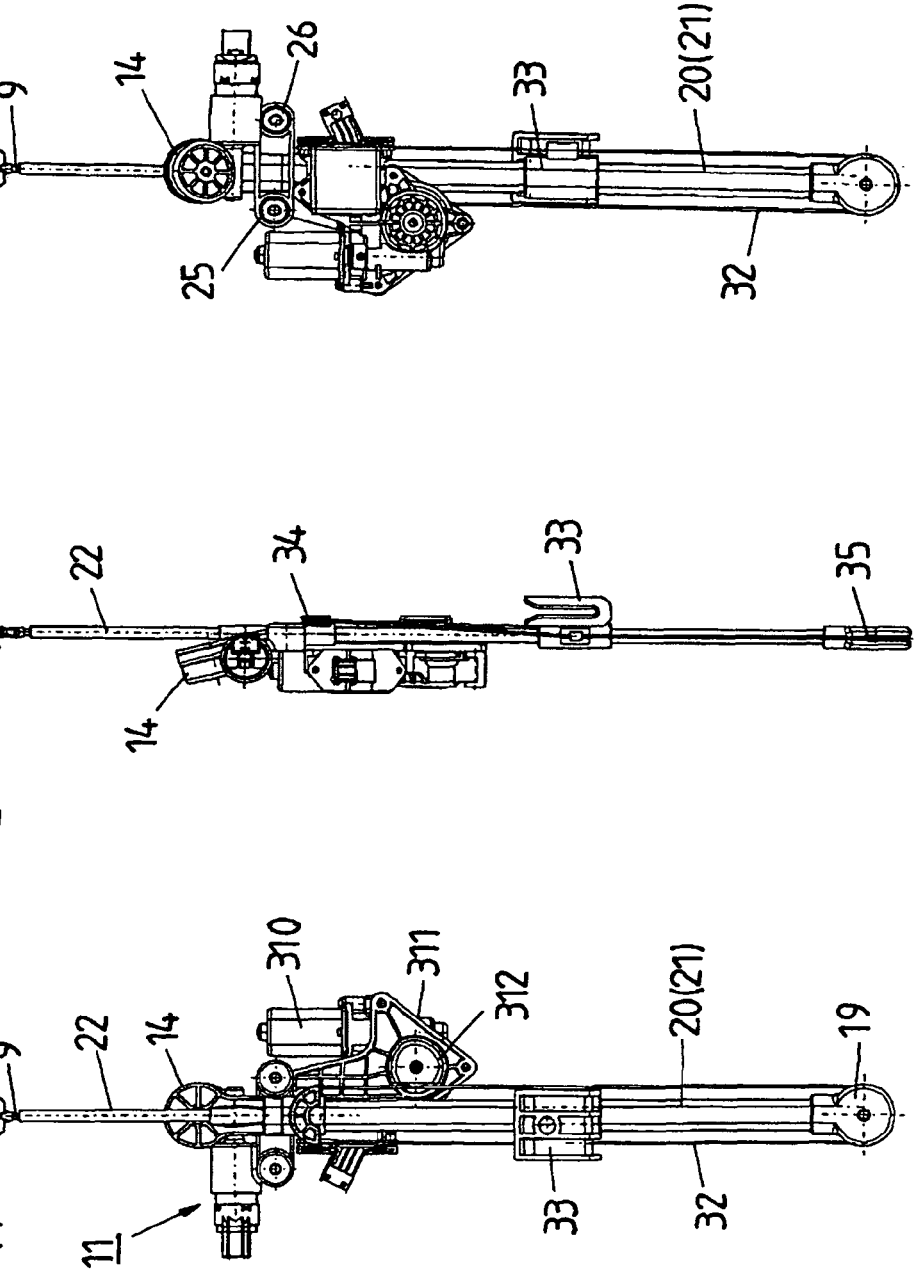

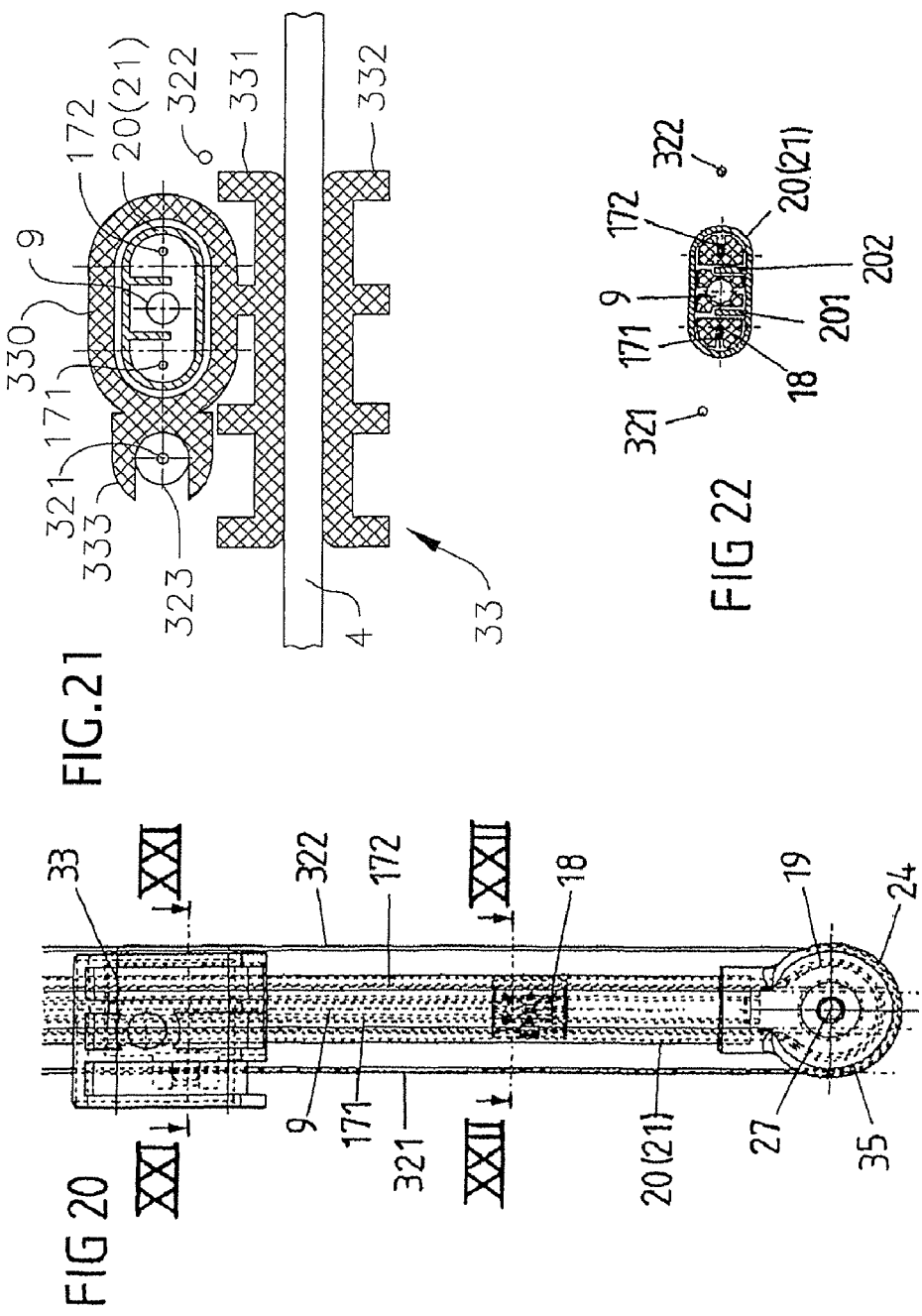

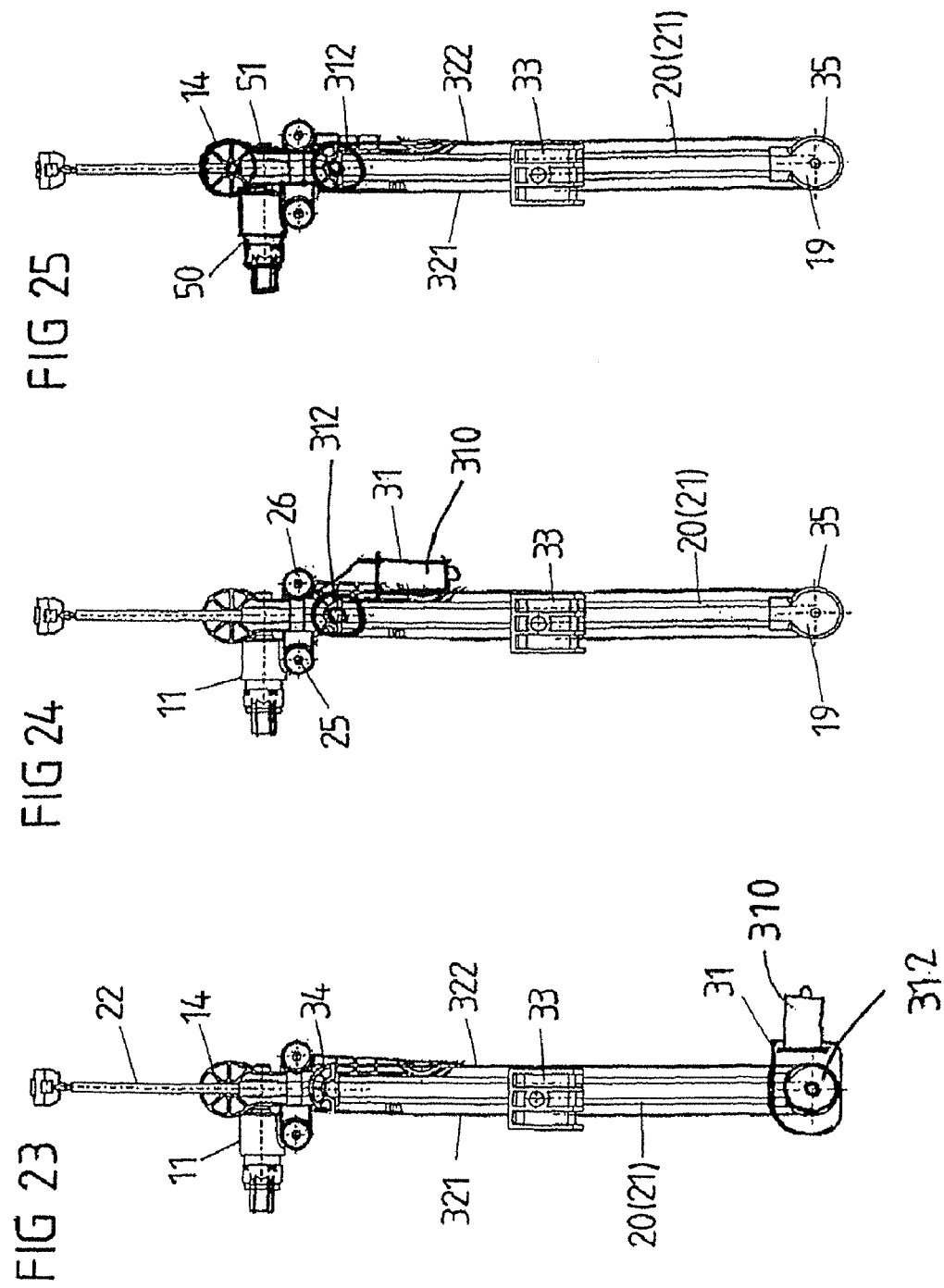

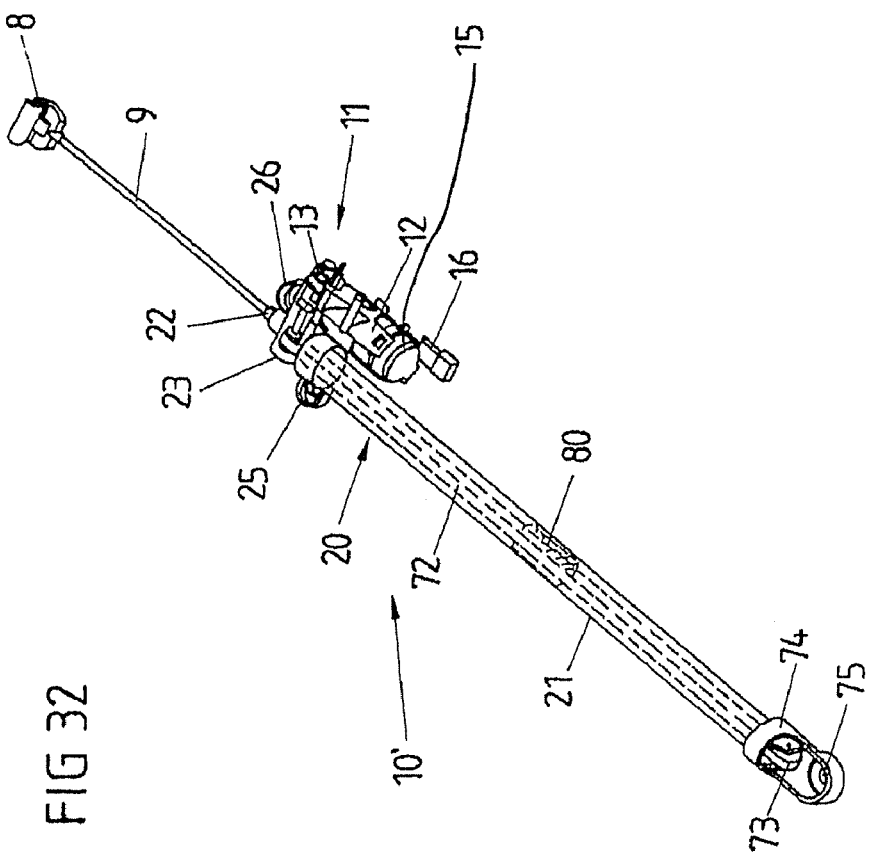

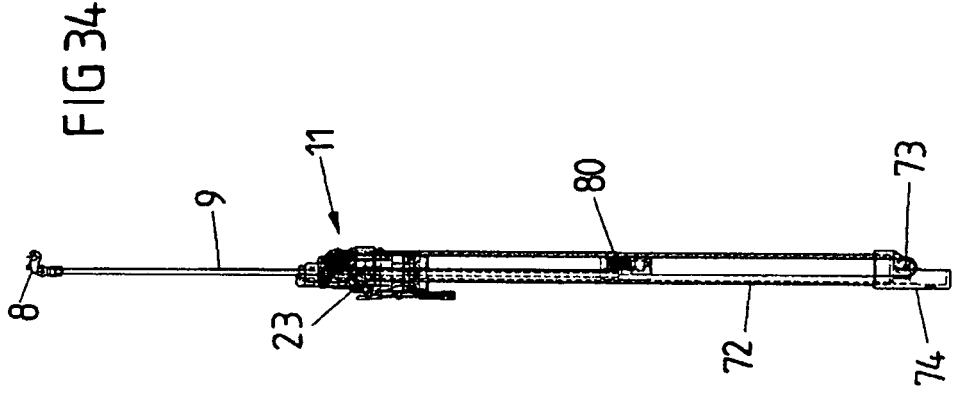
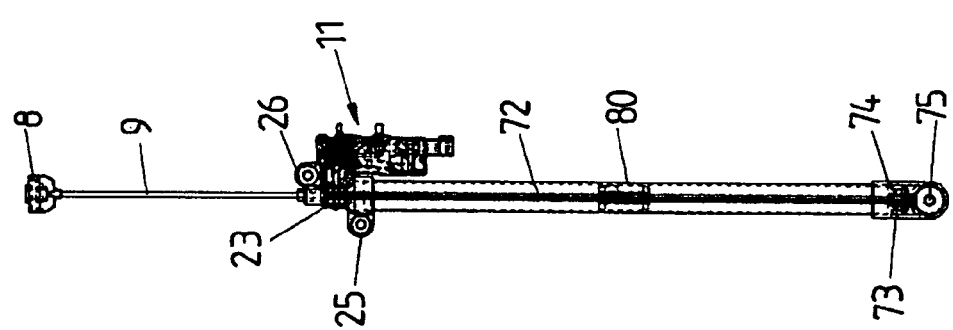

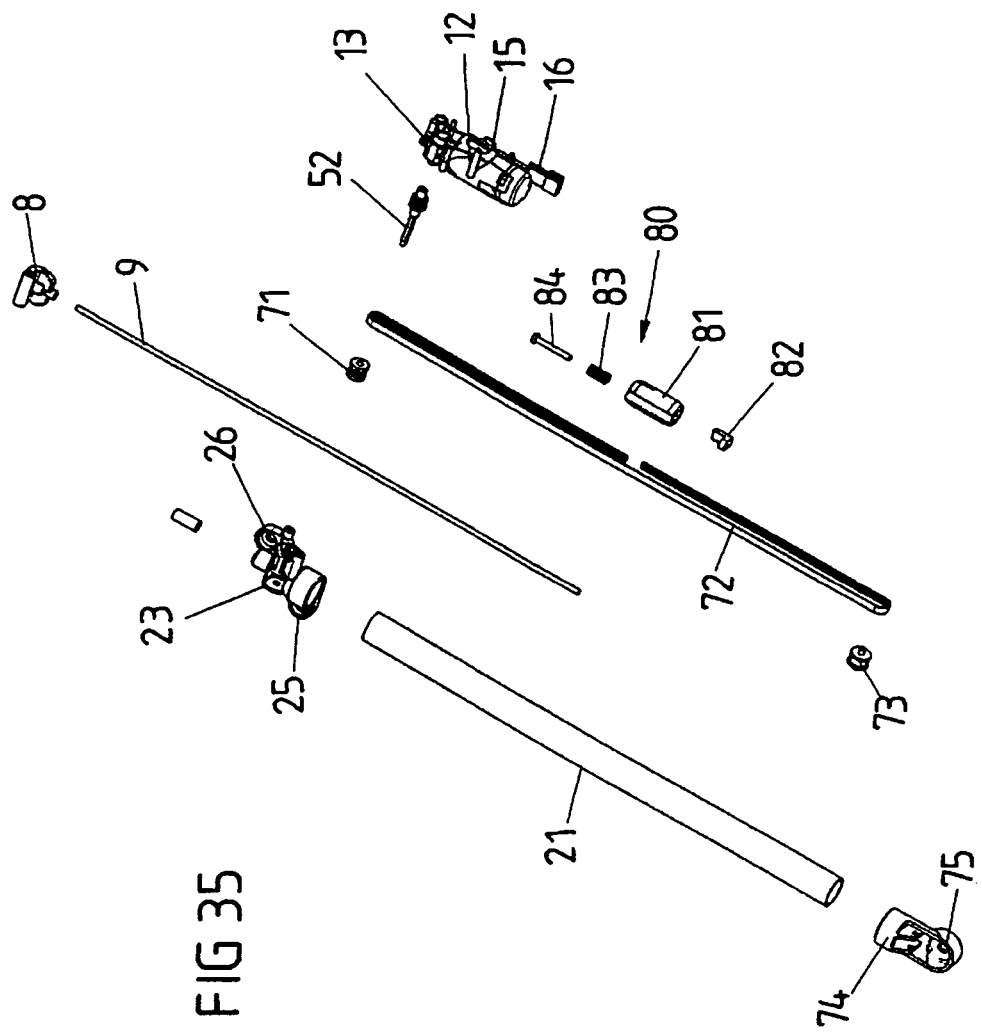

BLINDS FOR VEHICLES

CROSS-REFERENCE TO A RELATED APPLICATION

This application is a National Phase Patent Application of International Patent Application Number PCT/EP2007/060292, filed on Sep. 28, 2007, which claims priority of German Patent Application Number 10 2006 047 359.0, filed on Sep. 29, 2006 and German Patent Application Number 10 2006 058 360.4, filed on Dec. 5, 2006.

BACKGROUND

The invention relates to a vehicle roller blind, in particular a sunshield roller blind for motor vehicles.

EP 1 123 824 A2 discloses a sunshield roller blind for a motor vehicle, which sunshield roller blind has a rotatably mounted winding shaft which is arranged between the inner door panel and the inner door lining on the dry-space side of a motor vehicle door. A roller blind material or roller blind web is wound on the winding shaft, the outline of which roller blind material or roller blind web corresponds to the shape of the side window of the motor vehicle door and has an encircling edge which comprises a section which is fastened to the winding shaft and a section which is pulled by an actuating means, which is connected to a drive means, through a slot in the door sill and inner door lining and which is pulled from the winding shaft in the same movement direction as the movement direction of the moveable side window from bottom to top, that is to say from the bottom window frame edge which adjoins the door box of the motor vehicle door and which runs substantially horizontally.

The actuating means for pulling the roller blind web from the winding shaft is composed of sliding guide blocks, which are arranged below the winding shaft on the motor vehicle door and at a spacing from one another and from which a cylindrical actuating element which is rigid in compression and relatively bending-resistant extends upward, the lower ends of which actuating element run through guide tubes from the sliding guide blocks to a drive motor and into the gearing thereof and are driven synchronously with one another. As the actuating elements are deployed out of the guide tubes, the actuating elements press a roller blind tension rod or "bar", which is connected to an upper edge, which is remote from the winding shaft, of the roller blind web, upward and thereby unwind the roller blind web from the winding shaft counter to the action of a rotary restoring spring in the winding shaft. In the state in which it is completely or partially unwound from the winding shaft, the roller blind web is tensioned, and thereby held taut, by the force action of the actuating elements on the roller blind tension rod and by the rotary spring which is connected to the winding shaft.

The construction of the adjusting mechanism of the known roller blind makes it necessary to arrange the adjusting mechanism on the dry-space side of a motor vehicle door, since the guide pipes for holding the actuating elements serve only to guide said actuating elements and the drive device which drives the actuating elements and which has an electric motor necessitates an arrangement on the dry-space side.

SUMMARY

The present invention is based on the problem of specifying a vehicle roller blind whose adjusting device is of compact design and can be used in a versatile manner.

The exemplary solution according to an exemplary embodiment of the invention permits a compact design of the adjusting device for a vehicle roller blind, and versatile use thereof.

The compact design and versatile use of the adjusting device according to an exemplary embodiment of the invention for a vehicle roller blind, in particular for a motor vehicle roller blind, result from the design of the adjusting device in the manner of a single-strand cable window lifter and the at least partial encapsulation of said adjusting device, and the likewise at least partial encapsulation of the thrust element which is driven by the adjusting device, such that the adjusting device can be arranged at any desired location in a vehicle body or vehicle door, and therefore also without problems on the wet-space side of a vehicle door. The creation of interfaces between the individual adjusting means of the adjusting device permits a modular design, such that, by means of a configuration of the adjusting means which is freely selectable within wide limits, a combination with other elements in a vehicle door or vehicle body, in particular with a window lifter for lifting and lowering a window pane of a motor vehicle door, is made possible.

The exemplary solution according to an exemplary embodiment of the invention can be used for vehicle roller blinds or in particular motor vehicle roller blinds of any type, such as sunshield roller blinds for window panes, transparent vehicle covers, sliding roofs, for luggage space covers and for space partitions between the front and rear seats and between the passenger space and luggage space, and is suitable both for installation in a vehicle body or conventional vehicle door and also for being pre-mounted on a door module or for being mounted on a base plate or an inner door panel of a vehicle door.

To form the adjusting device in the manner of a single-strand cable window lifter, and for the encapsulated arrangement together with the thrust element, the adjusting device comprises a flexible traction means for transmitting force to the thrust element, a traction means drive element which is connected to a roller blind drive and which adjusts the flexible traction means in a direction which causes the thrust element to be raised or lowered, and a traction means deflector at least one end of the adjustment path of the thrust element, on which traction means deflector a section of the flexible traction means is guided.

The at least partially encapsulated arrangement of the thrust element and of the adjusting device is preferably realized by means of a housing which holds the thrust element and the adjusting device and which, for the possibility of a modular design, has a drive housing, which surrounds a roller blind drive of the adjusting device, and a preferably tubular guide channel which holds the thrust element and a flexible traction means which is connected to the thrust element and to the roller blind drive.

The exemplary solution according to the invention encompasses all variants from a complete encapsulation of the adjusting device and of the thrust element to an at least partially open guide channel which is open, in particular slotted, at least over a part of its periphery and its length. In the case of complete encapsulation, the housing seals off the adjusting device and the thrust element in a dust- and moisture-tight fashion, such that the parts which are encapsulated in this way, specifically the adjusting device and the thrust element, of a vehicle roller blind can be used in wet-space and dry-space regions of a vehicle body or of a vehicle door.

The modular design of the adjusting device can in particular be realized in that the drive housing comprises the traction means drive element, the traction means deflector is arranged in a traction means deflector housing, and a moisture- and dust-tight connection, preferably embodied as a plug-type connection, of the drive housing and of the traction means deflector housing to the guide channel is provided.

As a result of the in particular plug-type connection of the drive housing, guide channel and traction means deflector modules, a variable design is ensured for example with the same roller blind drive and with the same traction means deflector with different lengths of the guide channel for different sizes of a vehicle door and of its window cutout, and ensures simple, reliable assembly for a dust- and moisture-tight arrangement of the functional parts of the adjusting device in a housing which encapsulates these. Here, the drive housing can, as a head part of the adjusting device with bearing points for the roller blind drive and for the traction means drive element, form fastening points for fastening the head part to the body or to a mounting plate and can form a guide for the traction element, and can thereby serve multiple functions.

Alternatively, the traction means can be deflected directly in the guide channel, such that a closure cover is provided instead of a traction means deflector housing, which closure cover closes off that end of the guide channel which is adjacent to the traction means deflector. To seal off the closure cover, it is possible for a seal, in particular an O-ring seal, to be provided.

The lower end of the thrust element which is rigid in compression and/or bending-resistant can be directly connected to the flexible traction means of the adjusting device or to a roller blind driver which is driven by means of the flexible traction means and which is guided in the guide channel with a positive fit perpendicularly with respect to its movement direction.

While the direct connection of the thrust element to the flexible traction means is suitable and cost-effective for small roller blind webs, the coupling of the thrust element to a roller blind driver which is guided within the guide channel with a positive fit permits precise, substantially play-free guidance of the thrust element, and therefore allows the roller blind web to be pulled correctly from the winding shaft even in the case of large roller blind webs.

In order to keep the flexible traction means taut even in the event of a change in length as a result of the tensile stresses acting on the flexible traction means, and to thereby ensure precise guidance of the flexible traction means in the traction means drive element and the traction means deflector and prevent collisions with the thrust element, the roller blind driver has a device for adjusting the flexible traction means and/or the traction means drive element or the traction means deflector is connected by means of a traction means tensioning device to the guide channel.

The device provided in the roller blind driver for adjusting the flexible traction means preferably has two driver elements which are adjustable relative to one another in the movement direction of the roller blind driver, which driver elements are connected in each case to one end of the flexible traction means and are braced against one another by means of a pressure spring.

Said device for adjusting the flexible traction means is suitable in particular for an open design, which does not form a closed ring, of the flexible traction means, whose ends are connected to one another by means of a roller blind driver. In contrast, the arrangement of a traction means tensioning device and its connection to the traction means drive element and/or to the traction means deflection is suitable for a flexible traction means which forms a closed ring. Said traction means tensioning device is preferably composed of a tensioning lever which is connected to the traction means deflector and which is supported on the closure cover via a tensioning spring.

To secure the connection of the flexible traction means to the roller blind driver, it is possible in one preferred embodiment for positive-fit elements to be provided in the roller blind driver, which positive-fit elements are connected to mating positive-fit elements of the flexible traction means. Said mating positive-fit elements of the flexible traction means can be arranged at the point of the connection of the flexible traction means to the roller blind driver, for example by means of embossing into the flexible traction means, or can in particular be provided for a flexible traction element which is provided overall with positive-fit elements and which is composed for example of a toothed belt, punched belt, friction belt or chain.

For the dust- and moisture-tight encapsulation of the thrust element, the guide channel runs from a lower articulation, which is connected to the vehicle body, to a wet/dry space partition of the vehicle body.

The substantial encapsulation of the thrust element outside the pull-out path of the roller blind web from the winding shaft to the upper window frame edge ensures, in addition to the possibility of arranging the adjusting device of the roller blind at the wet-space side, a significant reduction in the risk of the thrust element becoming dirty. Since the thrust element is arranged between the window pane and the roller blind web, and is not accessible to the user on account of the simultaneous adjustment of the window pane and of the roller blind web or the coupling of the adjustment of the roller blind web to the closed state of the window pane in order to protect the roller blind web from damage caused in particular by relative wind, a dirty thrust element cannot be cleaned and would inevitably lead to the roller blind web becoming dirty.

The guide channel is preferably composed of an upper guide tube which holds the thrust element and which runs from the drive housing or the traction means deflector to the wet/dry space partition of the vehicle body, and a lower guide tube which holds the roller blind driver and the flexible traction means and which runs from the drive housing or the traction means deflector to the lower articulation of the adjusting device to the vehicle body.

The modular design of the adjusting device of the roller blind makes it possible either for the traction means drive element to be arranged between the upper and lower guide tubes and for the traction means deflector to be arranged at the lower end of the lower guide tube or, conversely, for the traction means drive element to be arranged at the lower end of the lower guide tube and for the traction means drive element to be arranged between the upper and lower guide tubes, with it being possible in both arrangements of the traction means drive element and of the traction means deflector for the roller blind drive to be arranged perpendicular or parallel to the lower guide tube.

The modular design of the adjusting device also permits any desired cross-sectional shapes of the guide channel or of the upper and/or lower guide tube, since the guide tubes are connected to a roller blind drive, which corresponds to the respective application, and to a cable deflector, preferably by means of a plug-type connection. This permits the production of extruded guide tubes whose cross section is circular or elliptical or square or rectangular. In the latter embodiment, a front side of the square or rectangular lower guide tube is designed to be hinged and latchable.

To fix the adjusting device to a base plate, mounting plate or to the inner door panel of a vehicle door, the drive housing has fastening elements and the traction means drive element and/or the traction means deflector have/has a bore arranged at the central point of the traction means drive element and/or traction means deflector, while the upper end, which is remote from the lower guide tube, of the upper guide tube is preferably plugged through a moisture-tight tube leadthrough, which is matched to the cross section of the upper guide tube, in the wet/dry space partition of the vehicle body or vehicle door.

A further exemplary embodiment of the invention consists in the integration of parts of a window lifter, which is arranged in a vehicle door, into parts of the adjusting device of the roller blind, in particular in an integral or two-piece connection of the lower guide tube or of the guide channel of the adjusting device of the roller blind to a guide rail of the window lifter.

The integration of the window lifter into the roller blind obtains a synergetic effect which permits a space-saving arrangement of the window lifter and roller blind, ensures increased stability of the adjusting devices, which support one another, of the roller blind and of the window lifter, and permits an optimally coordinated arrangement of the drive devices, to the point of being able to use a common drive.

In the case in particular of an integral connection of the lower guide tube or of the guide channel to a guide rail of the window lifter, an increased level of stiffness is obtained with a minimum volume and therefore weight and spatial requirement, and the common use of drive means is permitted as a result of the drive means being closely adjacent to one another.

In one exemplary embodiment, the lower guide tube of the guide channel is embodied as a guide rail of the window lifter and, in a further exemplary embodiment, makes it possible for a window lifter driver for example of a cable window lifter to be guided on the outer contour of the lower guide tube.

In said exemplary embodiment of the solution according to the invention, the guide rail of the window lifter is replaced by the guide channel or the lower guide tube, such that the guide channel of the adjusting device of the roller blind can be used either for encapsulating and guiding the thrust element, the flexible traction means and if appropriate the driver of the adjusting device for the roller blind, or additionally for guiding a window lifter driver or, if dispensing with a roller blind, solely as a guide rail for the window lifter driver. As a result of this universal applicability of the guide channel, it is possible to dispense with the storage and provision of different adjusting parts for a roller blind and for a window lifter, such that production and assembly costs are minimized.

Alternatively, the lower guide tube and the guide rail of the window lifter can be formed in two parts and arranged adjacent to one another so as to run parallel to one another.

To further simplify assembly and reduce production costs by means of a synergetic effect, the adjusting device for the roller blind and the window lifter for lifting and lowering a window pane are arranged on a common base plate, and have common deflecting devices.

In addition, the window lifter drive can be arranged at the lower end of the guide channel which, with its outer contour, serves as a guide rail, and a window lifter cable drum can form the lower deflector for the window lifter cable, while an upper window lifter cable deflector is either formed as a part of the roller blind drive or is plugged into the drive housing of the roller blind drive.

Alternatively, the window lifter cable drum forms the upper window lifter cable deflector and the electric motor of the window lifter drive is aligned toward the lower end of the guide channel or lower guide tube.

A maximum synergetic effect is obtained by means of an electric motor and a switchover gearing which are provided both for driving the adjusting device of the roller blind and also for the window lifter drive and which are coupled either to the adjusting device of the roller blind or to the window lifter for driving a window lifter cable drum.

The flexible traction means can, in a first variant, be composed of a roller blind cable which is formed as a steel cable or, in a preferred embodiment, as a plastic-encapsulated steel cable or plastic cable, with the two latter embodiments ensuring low friction and smaller winding or deflecting radii without the risk of cable breakage.

In a further exemplary embodiment of said solution according to the invention with a roller blind cable, webs or ribs are arranged in the lower guide tube, which webs or ribs run in the longitudinal direction of said lower guide tube and separate the thrust element from the cable strands of the roller blind cable and form a part of the positive-fit guide of the roller blind driver.

As a result of the separation of the thrust element from the usually greased cable strands of the roller blind cable, a transmission of grease and dirt particles to the thrust element is prevented, which could lead to the roller blind web becoming dirty and, on account of the above-described problems in accessibility of the thrust element, the necessity of an intervention by experts is made superfluous. As a result of the additional guide of the driver, the risk of misalignment of the driver within the guide channel or within the lower guide tube is avoided, and reliable operation of the roller blind is thereby ensured.

A further exemplary embodiment of the solution according to the invention is characterized in that the roller blind drum is arranged at an acute angle with respect to the lower guide tube and the upper guide tube is aligned so as to run as an extension of the lower guide tube.

Said alignment and arrangement of the roller blind drum and of the upper guide tube permits an even more compact design of the encapsulated adjusting device and, in a further embodiment, a roller blind drive which is simple to produce. If the roller blind drive is composed of an electric motor, which is connected to drive electronics, and a gearing with a drive worm which meshes with a worm gear of the roller blind cable drum, the roller blind cable drum can be inclined with respect to the drive worm in such a way that the worm gear can have a straight toothing and can therefore be produced using simple tools. If the axes of a drive worm and of a worm gear which meshes with the drive worm are arranged perpendicular to one another, a helical toothing of the worm gear is imperatively necessary, such that with a corresponding offset of the axes of the worm gear and of the drive worm, a straight toothing of the worm gear is made possible, which offers considerable production advantages over a helical toothing.

In the case in particular of guide channels or guide tubes produced from plastic, the different cross sections, of any desired design and matched to the respective application, of the guide tubes can if appropriate be produced with additional ribs and webs in their interior for separating the thrust element from the cable strands of the roller blind cable by means of extrusion, with a hinged wall of a square or rectangular lower guide tube permitting simple access during the assembly of a driver and roller blind cable.

As an alternative to a roller blind cable as a flexible traction element for the adjusting device of the roller blind, it is possible for a toothed belt, punched belt, friction belt, in particular a V-belt, or a chain, in particular a link chain or bead chain, to be provided. While a toothed belt, punched belt and a chain permit a positively-fitting drive connection between the roller blind drive and the flexible traction means for adjusting the traction element, and transmit the drive movement substantially without slip for adjusting the thrust element, a friction belt embodied in particular as a V-belt offers a large force-transmission surface which prevents slipping and therefore slip between the roller blind drive and the thrust element.

A roller blind drive which is matched to a toothed belt, punched belt, friction belt or a chain as a flexible traction means has an electric motor, which is connected to drive electronics, and a gearing with a driveshaft which is connected to a traction means drive element, embodied as a drive pinion, with positive-fit elements which engage into mating positive-fit elements of the flexible traction means, while the traction means deflector is composed of a deflecting roller whose axis is aligned perpendicular to the movement direction of the flexible traction means and engages with positive-fit elements into mating positive-fit elements of the flexible traction means which is embodied as a toothed belt, punched belt, friction belt or chain.

In particular, the flexible traction means, which is provided with positive-fit elements, in the form of a toothed belt, punched belt or a chain, permits both an open and also a closed embodiment, and accordingly tautening by means of a traction means tensioning device which engages on the traction means deflector or by means of a tensioning device which is integrated into the roller blind driver and which tensions the ends for example of an open toothed belt toward one another.

The integration of parts of a window lifter into the adjusting device, which is embodied in the manner of a single-strand cable window lifter, for adjusting a roller blind web of a vehicle roller blind, permits a modular system in which the vehicle roller blind and the window lifter are constituent parts of the module which forms a device for adjusting a window pane of a window lifter and/or of a roller blind drive of a vehicle roller blind, which vehicle roller blind is connected to a thrust element, which is rigid in compression and/or bending-resistant and which is connected to an adjusting device, for tensioning the roller blind web, with the adjusting device being embodied in the manner of a single-strand cable window lifter and being at least partially encapsulated together with the thrust element, and in that parts of the window lifter can be integrated into parts of the adjusting device for the vehicle roller blind.

Both constituents of the module can be used both separately and also in combination with one another, that is to say the adjusting device can be used for adjusting the roller blind web of a vehicle roller blind or as a receptacle and guide device for parts of the window lifter.

In the case of a combined use of the adjusting device both for the adjustment of a roller blind web of a vehicle roller blind and also for the adjustment of a window pane of a window lifter, independent control of the two systems or else associated with an unwinding of the roller blind web or an opening of a window pane is associated with a winding-up of a roller blind web, such that damage to the roller blind web by relative wind during driving is prevented. In the case of independent control of the window lifter and of the vehicle roller blind, it is equally possible to provide a locking action for deploying the roller blind web when the window pane is partially and/or completely open.

BRIEF DESCRIPTION OF THE DRAWINGS

The drawing illustrates various exemplary embodiments of the invention which show, in numerous variants, further possible applications of the invention, the design and advantages of which are described below. In the figures:

FIG. 9 shows a partial view of the lower end of the guide channel of the first adjusting device.

FIG. 10 shows a section through the guide channel along the line X-X in FIG. 9.

FIG. 11 shows a section through the guide channel along the line XI-XI in FIG. 9 in the region of a roller blind driver situated there

FIG. 15 shows a perspective illustration, from a second viewing direction, of a cable window lifter integrated into the first adjusting device for a roller blind.

FIG. 17 shows a front view of the cable window lifter integrated into the first adjusting device of the roller blind.

FIG. 18 shows a side view of the cable window lifter integrated into the first adjusting device of the roller blind.

FIG. 19 shows a rear view of the cable window lifter integrated into the first adjusting device of the roller blind.

FIG. 20 shows a plan view of the lower end of the guide channel of the first adjusting device for the roller blind, with a roller blind driver of the adjusting device of the roller blind guided therein, and a window lifter driver of a cable window lifter guided on the outer contour.

FIG. 21 shows a section through the guide channel along the line XXI-XXI in FIG. 20 in the region of a window lifter driver situated there.

FIG. 22 shows a section through the guide channel along the line XXII-XXII in FIG. 20 in the region of a roller blind driver situated there.

FIG. 23 shows a first arrangement and design of the window lifter drive.

FIG. 24 shows a second arrangement and design of the window lifter drive.

FIG. 25 shows a third arrangement and design of the window lifter drive.

FIG. 32 shows a perspective illustration of a second adjusting device with a positively fitting, flexible traction means in the form of a toothed belt.

FIG. 33 shows a front view of a second adjusting device with a positively fitting, flexible traction means in the form of a toothed belt.

FIG. 34 shows a side view of a second adjusting device with a positively fitting, flexible traction means in the form of a toothed belt.

FIG. 35 shows a perspective view of the individual parts of the second adjusting device.

FIG. 43 shows a side view of the roller blind driver, which is connected to a toothed belt, as per FIGS. 40 to 42.

DETAILED DESCRIPTION

Figure 1:
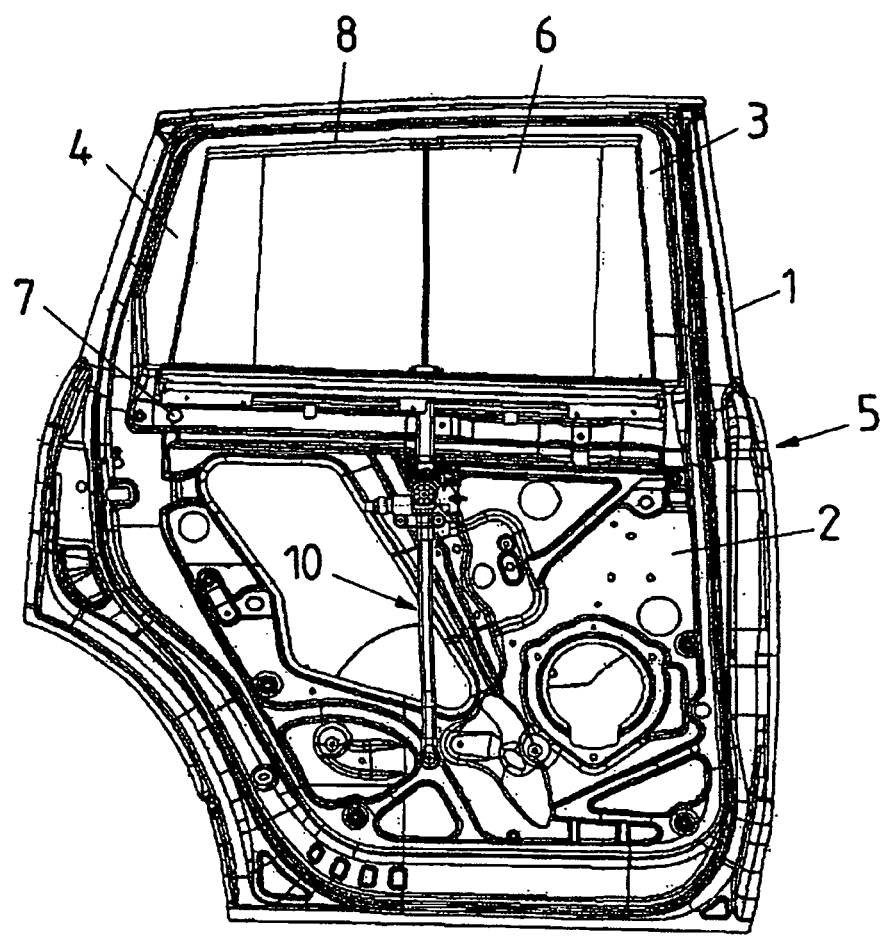
FIG. 1 shows a longitudinal section through a motor vehicle door having a roller blind and an adjusting device for the roller blind.

FIG. 1 shows a longitudinal section through a motor vehicle door 1 with a door slot 2 which is defined by an outer door skin, an inner door panel and an inner door lining which, in the illustration of FIG. 1, has been removed in order to make it possible to see into the door slot, and with a door cutout 3 which can be covered by a window pane 4 which is adjustable in the longitudinal direction of the motor vehicle door 1. The door cutout 3 is delimited by an encircling window frame edge composed of an upper, a lateral and a lower window frame edge. To protect the vehicle interior space from undesired heating and to protect the vehicle occupants from glare from obliquely incident sunlight, a roller blind 5 is provided which has a roller blind material or roller blind web 6 whose contour is matched approximately to the contour of the door cutout 3 such that, when the roller blind 5 is fully deployed, the door cutout 3 is substantially covered when the window pane 4 is closed.

In the retracted state, the roller blind web 6 is wound on a winding shaft 7 which is arranged in a roller blind cassette which is arranged at the upper door sill of the door slot 2. The opposite edge of the roller blind web 6 from the winding shaft 7 is connected to a roller blind pull rod or "bar" 8, by means of which the roller blind web 6 is pulled from the winding shaft 7, conventionally counter to the action of a rotary spring which is connected to the winding shaft 7, in order to cover the door cutout 3.

Alternatively, it is possible instead of a winding shaft to provide only a container or a roller blind cassette which holds the roller blind web 6 in a folded state in the non-tensioned state. Here, the arrangement can be selected such that the roller blind web is tautened by means of a fastening of the lower and upper edges, for example by means of a tensioning device, only when said roller blind is completely pulled out of the roller blind cassette.

To pull the roller blind web from the winding shaft 7 or to pull the roller blind web 6 from a roller blind cassette which holds the folded roller blind web 6, that edge which is connected to the roller blind pull rod 8 and which is situated opposite the winding shaft 7 or the roller blind cassette is connected to a thrust element 9, usually in the form of a thrust rod, which is rigid in compression and/or bending-resistant and which is adjusted in the longitudinal direction of the motor vehicle door 1 by means of an adjusting device.

To protect said roller blind 5 or to protect the roller blind web 6 from damage or destruction by relative wind when the window pane 4 is open, the adjustment of the roller blind 5 takes place synchronously with or as a function of the position of the window pane 4, such that the roller blind 5 can be pulled from the winding shaft 7 only when the window pane 4 is deployed to the same extent or closed. Preferably, in a so-called "automatic operation", the roller blind is only completely tensioned or completely retracted, with a tensioning of the roller blind web 6 being enabled only when the window pane 4 is completely closed.

Figure 2:
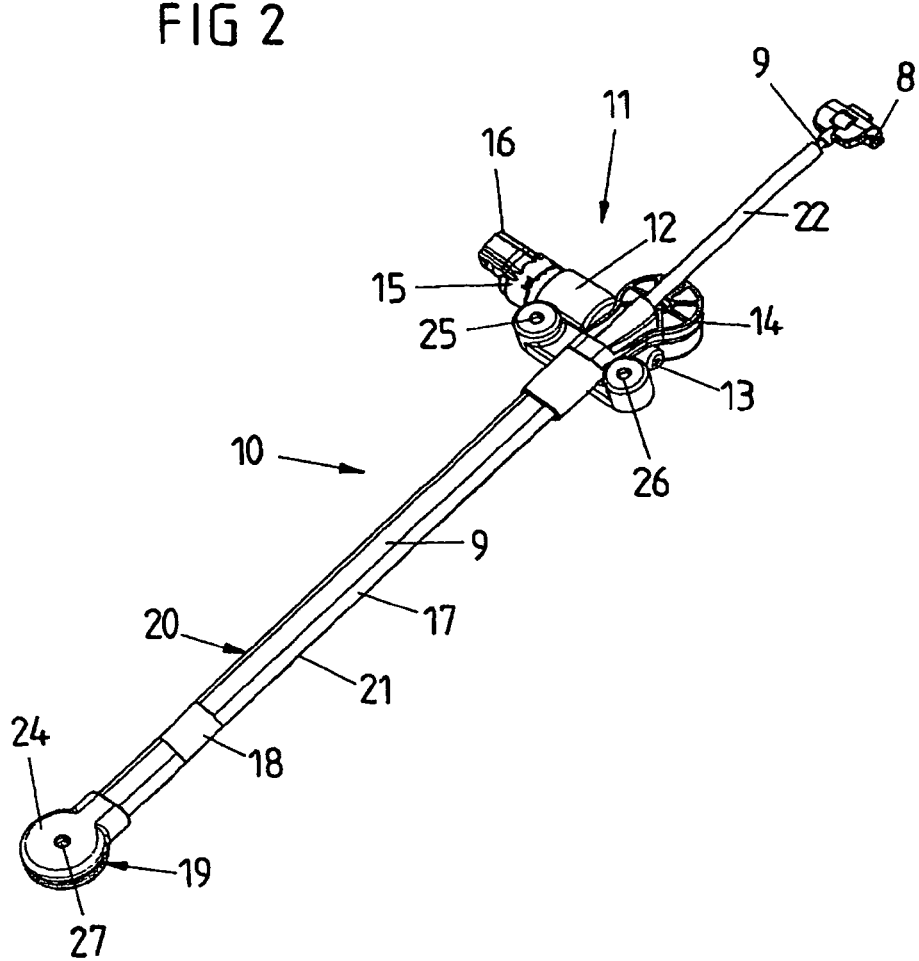
FIG. 2 shows a perspective illustration of a first embodiment of an adjusting device, with a roller blind cable as a flexible traction means.

The adjusting device 10 illustrated in FIG. 2 for the thrust element 9 is embodied in the manner of a single-strand cable window lifter and has an electromotive roller blind drive 11 which comprises an electric motor 12, a gearing 13 for driving a cable drum 14, drive electronics 15 and a plug 16 for connecting the roller blind drive 11 to control and regulating electronics of the motor vehicle or of the motor vehicle door, in particular to a bus system. The adjusting device 10 also has a preferably tubular guide channel 20 which is composed of a lower guide tube 21 and an upper guide tube 22 which are connected via dust- and water-tight connecting points to a drive housing 23 which encapsulates the roller blind drive 11.

In the lower guide tube 21 run the cable strands 171, 172 of a roller blind cable 17 which is mount on the cable drum 14 and which is connected to a driver 18 and which, at the opposite end of the lower guide tube 21 from the roller blind drive 11, is deflected by means of a cable deflector 19. The driver 18 is connected to the thrust element 9 such that, in the event of an actuation of the roller blind drive 11 and the resulting rotation of the cable drum 14 in the one or other rotational direction, the driver 18 is moved toward or away from the roller blind drive 11, and the position of the thrust element 9 is thereby changed.

Alternatively, an at least partially open guide channel 20 is provided which, in a preferred embodiment, is open, preferably slotted, over at least a part of its periphery and its length. Such a design of the guide channel 20 for example makes it possible for parts of a driver 18, which is arranged in the guide channel 20, for adjusting the thrust element 9 to engage through the slot of the guide channel 20 and to be connected to auxiliary parts or to actuate end position sensors, position measuring elements or the like. For dust- and moisture-tight sealing, it is possible in this embodiment to provide a corresponding seal which allows parts of the adjusting device 10 to extend through the guide channel 20 and which likewise keeps the interior space of the guide channel 20 free from dirt particles and moisture.

The thrust element 9 is guided in a likewise encapsulated fashion in the upper guide tube 22 and the cable deflector 19 is encapsulated by a cable deflector housing 24, with the connection of the cable deflector housing 24 to the lower guide tube 21 or to the guide channel 20 preferably being of equally dust- and water-tight design, by means of a sealing plug-in receptacle 231, as the connection of the upper guide tube 22 to the drive housing 23 or to the lower guide tube 21, preferably by means of a sealing plug-in receptacle 232. The length of the upper guide tube 22 or of the guide channel 20 is dimensioned such that the thrust element 9 projects out of the inner door lining, or wet/dry space partition of the vehicle body, from its end which is connected to the roller blind pull rod 8.

It is alternatively possible for an encapsulation of only the lower guide tube 21 to be provided, while the upper guide tube 22 serves merely as a longitudinal guide for the thrust element 9. The upper guide tube 22 can also be omitted entirely and it is self-evident that the upper guide tube 22, even in encapsulated form, holds the thrust element 9 completely up to the transverse connection to the roller blind pull rod 8 only in the retracted state, while the only partially or completely deployed thrust element 9 is also situated only partially in the encapsulated state within the lower guide tube 21 and upper guide tube 22 or in the upper guide tube 22.

The solution according to the invention also comprises an arrangement in which the upper guide tube 22 is guided up to the door sill even though the wet/dry space partition of the motor vehicle door 1 takes place below the door sill.

Instead of the separation, illustrated in FIG. 2, of the guide channel 20 into a lower guide channel 21 and an upper guide channel 22, the guide channel 20 can also be embodied as a continuous, preferably tubular guide channel 20 if a suitable cable inlet for the roller blind cable 17 is provided on the roller blind drive 11 and the connection of the continuous guide channel 20 to the drive housing 23 and to the cable deflector housing 24 is likewise of dust- and water-tight design.

The connection of the guide duct 20 and of the lower and upper guide tube 21, 22 to the drive housing 23 and to the cable deflector housing 24 preferably takes place by means of a sealing plug-in receptacle 231, 232 with corresponding tolerances for a dust- and water-tight connection. For the fastening of the adjusting device 10 to a base plate or mounting plate or to the inner door panel of the motor vehicle door as per FIG. 1, the adjusting device 10 has, on the drive housing 23, two fastening points 25, 26 which are situated opposite one another with respect to the guide channel 20, and the cable deflecting housing 24 has a central bore 27 for leading through a fastening means which is in particular connected to the inner door panel of the motor vehicle door 1.

Figure 3:
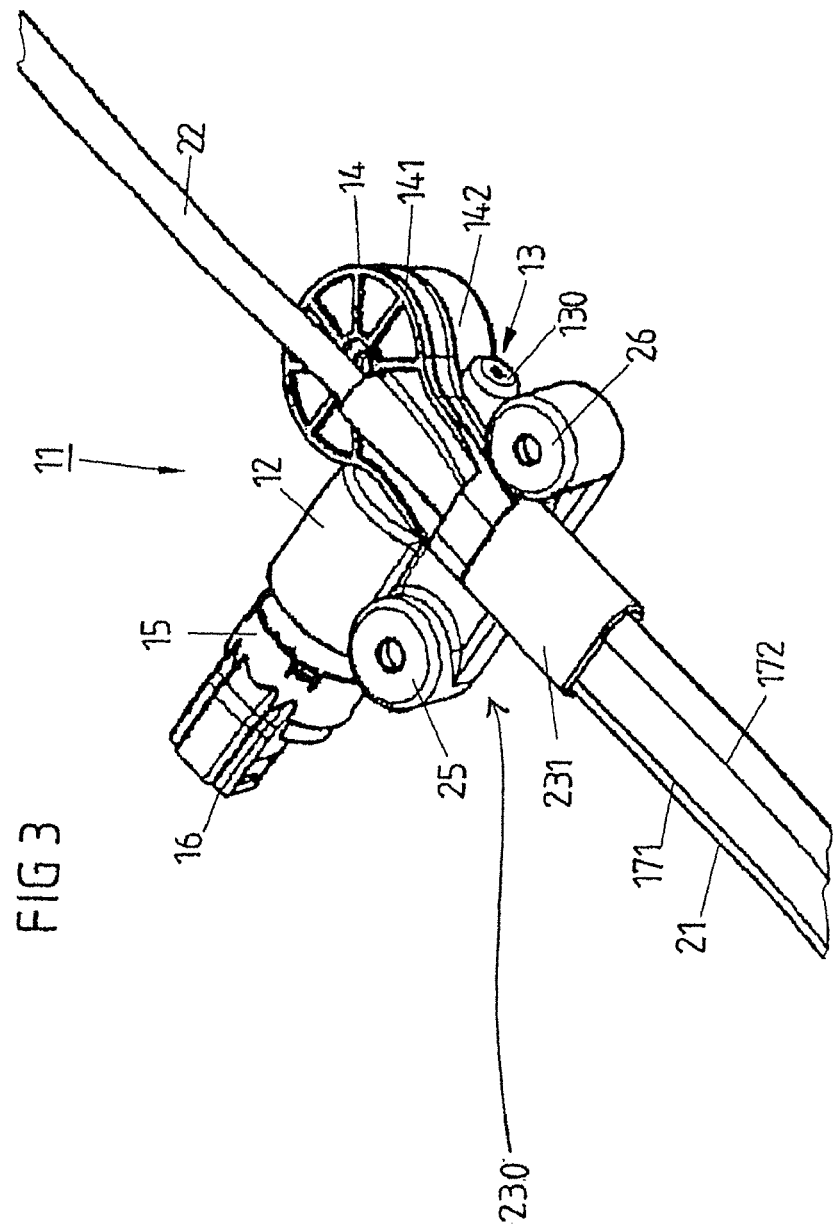
FIG. 3 shows an enlarged perspective illustration of the connection of the drive housing of the first adjusting device to a guide channel or guide tube.

FIG. 3 shows, in an enlarged perspective illustration, the adjusting device 10 in the region of the roller blind drive 11 with the electric motor 12, the gearing 13, the cable drum 14, the drive electronics 15 and the plug 16 for the electrical connection of the drive electronics 15 in particular to a bus system of the motor vehicle door 1. The enlarged illustration clearly shows the dust- and moisture-tight connection of the lower guide tube 21 by means of the sealing plug-in receptacle 231 to the drive housing 23 which is closed off by means of a drive housing cover 230 which, in the open state, permits simple assembly of the components of the roller blind drive 11, in particular assembly of the roller blind cable 17 which runs with its cable strands 171, 172 in the lower guide tube 21.

While the upper guide tube 22 is aligned substantially as a rectilinear elongation of the lower guide tube 21, the cable drum 14 is aligned at an acute angle with respect to the profile of the guide channel 20 formed from the lower and upper guide tubes 21, 22. The cable drum 14 has a cable groove 141 for holding the roller blind cable 17 in a force-fitting and positively-fitting manner, and a worm gear 142 which meshes with a drive worm 130 of the gearing 13 of the roller blind drive 11. With a corresponding inclination and lateral offset of the cable drum 14, the worm gear 142 can be formed with a straight toothing, thereby enabling cheaper production than for the helical toothing which would otherwise be required.

The adjusting elements, which can be connected to one another in particular by means of plug-type connections, of the adjusting device 10, specifically the roller blind drive 11, the preferably tubular guide channel 20 which can be composed of a lower and upper guide tube 21 or can be of continuous design, and the cable deflector 19, form individual modules of a modular system, which permits the connection of different materials, different sizes of the individual modules and different installation locations in a motor vehicle body or motor vehicle door. For example, different lengths of the guide channel 20 or of the lower guide tube 21 permit the use of the adjusting device 10 in different motor vehicle doors, the use of different roller blind drives 11 makes it possible to provide different levels of power, and different lengths of the upper guide tube 22 or of the guide channel 20 to the point of the upper guide tube 22 being omitted, or a corresponding length of the guide channel 20 to the roller blind drive 11, permits the use of the adjusting device 10 in the wet space or in the dry space of a motor vehicle door.

In the wet-space embodiment of the modular adjusting device 10, the length of the upper guide tube 22 or the length of the guide channel 20 in its integral design is dimensioned such that the adjusting device 10 is encapsulated over its entire length, such that no dust or moisture can penetrate into the encapsulated system of the adjusting device 10. To stabilize the position of the guide channel 20 or upper guide tube 22, the upper end of the latter which is situated opposite the roller blind drive 11 is plugged through a water-tight tube leadthrough 40, which is matched to the cross-sectional shape of the guide channel 20 or upper guide tube 22, in the wet/dry space partition of the motor vehicle door, in particular in the inner door panel of the motor vehicle door.

The upper guide tube 22 or the upper end of the continuous guide channel 20 can optionally be clipped to the inner door lining or to the inner door panel to provide secure fastening of the guide channel 20 or upper guide tube 22.

Figure 4:
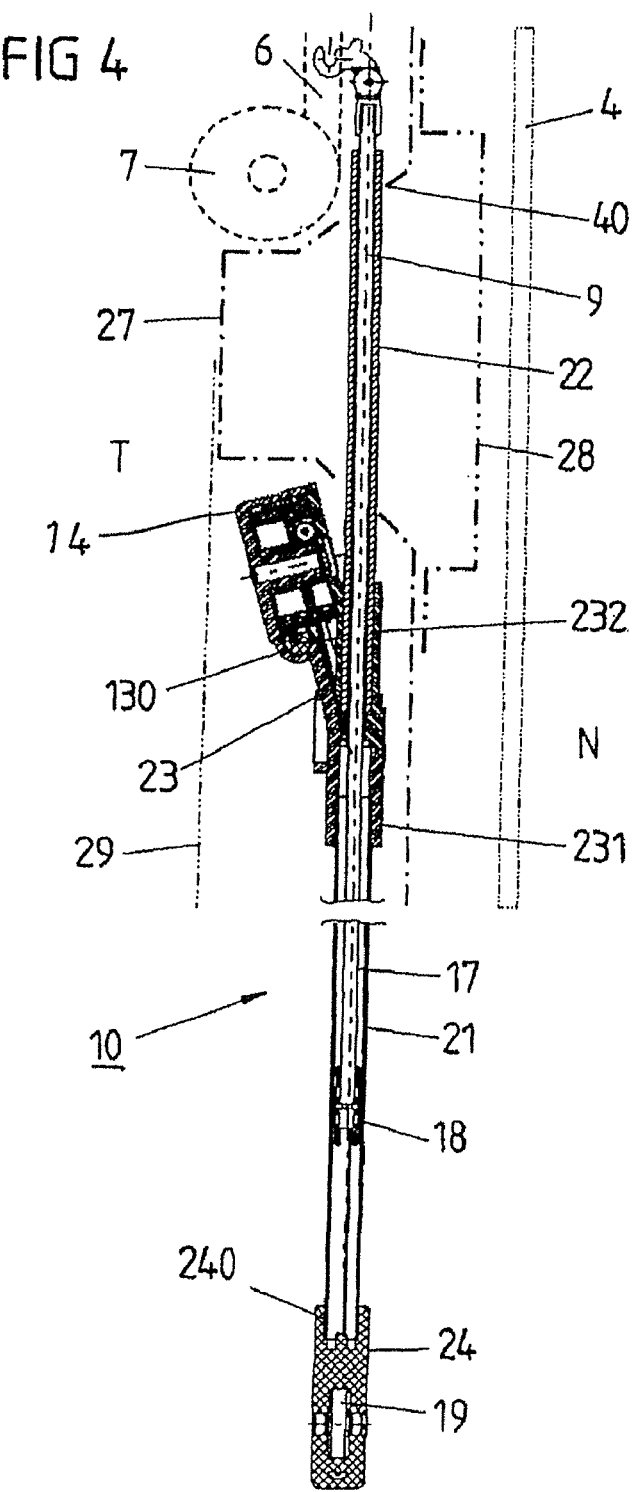
FIG. 4 shows a schematic longitudinal section through the motor vehicle door, with a first adjusting device for a roller blind installed therein, with a first design of inner door panel.
Figure 5:
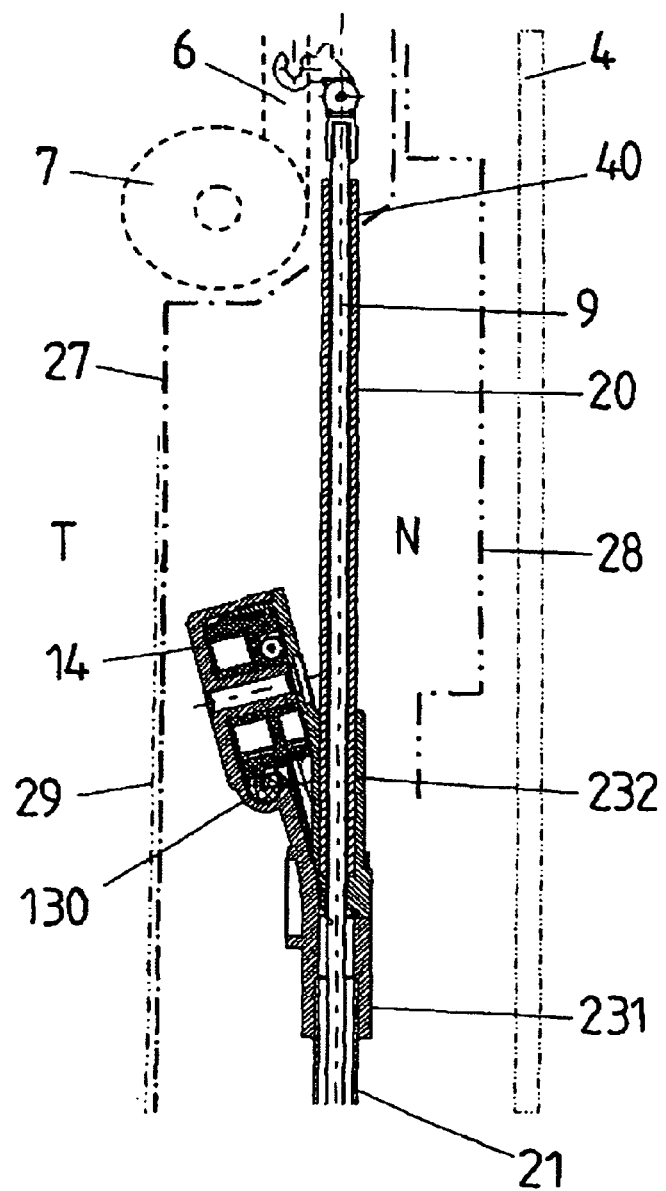
FIG. 5 shows a schematic longitudinal section through the motor vehicle door, with a first adjusting device for a roller blind installed therein, with a second design of inner door panel.

FIGS. 4 and 5 show the use of the adjusting device 10 for a roller blind with different profiles of the inner door panel, and of therefore the wet/dry space partition of the motor vehicle door, in a longitudinal section through the door slot 2 of the motor vehicle door 1 as per FIG. 1. At the same time, the longitudinal section illustrations of FIGS. 4 and 5 show an embodiment of the connection of the upper and lower guide tubes 21, 22 to the drive housing 23 of the roller blind drive 11 as per FIGS. 2 and 3.

The longitudinal sections, illustrated in FIGS. 4 and 5, through a motor vehicle door in the region of the door slot of a motor vehicle door show, with the outer door skin omitted, the window pane 4 which is arranged in the wet space of the vehicle door, an adjoining inner slot reinforcement 28 and the different profile of an inner door panel 27 and the arrangement of a sealing foil 29 for separating the dry space T, which runs at the left of the sealing foil 29, and the wet space N, which runs at the right of the sealing foil 29.

The inner door panel 27 schematically illustrated in FIG. 4 runs from the upper door sill to below the roller blind cassette for holding the winding shaft 7 of the roller blind on which the roller blind web 6 is wound. This is adjoined by a vertical section of the inner door panel 27 which in turn bends, above the cable drum 14 of the roller blind drive, toward the slot reinforcement 28 and merges into a section which runs between the adjusting device 10 of the roller blind and the window pane 4. As a result of the double support of the upper guide tube 22 on the inner door panel 27, particularly stable mounting of the upper guide tube 22 which guides the thrust element 9 is ensured, with the upper leadthrough of the upper guide tube 22 through the inner door panel 27 being designed as a water-tight tube leadthrough 40, such that the infiltration of moisture into the upper guide tube 22 via the opening for the leadthrough of the thrust element 9 is prevented.

The connection of the upper guide tube 22 and of the lower guide tube 21 to the drive housing 23 takes place by means of the sealing plug-in receptacles 231, 232 which are designed to be of sufficient length to obtain a sufficient sealing surface. FIGS. 4 and 5 also show the arrangement and alignment of the cable drum 14 in relation to the lower and upper guide tubes 21, 22, the arrangement of the drive worm 130 and the leadthrough of the roller blind cable 17 to the lower guide tube 21. The driver 18, which is guided in the lower guide tube 21 with a positive fit perpendicularly with respect to its movement direction, is connected to the roller blind cable 17 which is deflected at the lower cable deflector 19 which is arranged so as to be protected in a dust- and water-tight fashion in the cable deflector housing 24 which is likewise connected by means of a sealing plug-in receptacle 240 to the lower guide tube 21. Here, the lower cable deflector 19 can optionally be embodied as a cable roller or as a slide element, with a cable roller being mounted in corresponding axle receptacles of the cable deflector housing 24.

In the embodiment in FIG. 5, which illustrates only the upper part of the door slot, after the section which runs below the roller blind cassette for holding the winding shaft 7, the inner door panel 27 runs vertically, that is to say on the opposite side of the adjusting device 10 from the window pane 4 in relation to the adjusting device 10, such that the upper guide tube 22 is supported only in its upper region at the water-tight tube leadthrough 40 through the inner door panel 27, while the lower end of the upper guide tube 22 is supported by means of the sealing plug-in receptacle 232 on the drive housing 23, which is in turn fastened by means of the fastening points 25, 26 as per FIGS. 2 and 3 to the inner door panel 27 or to a base or mounting plate in the door slot 2 of the motor vehicle door 1 as per FIG. 1.

Figure 6:
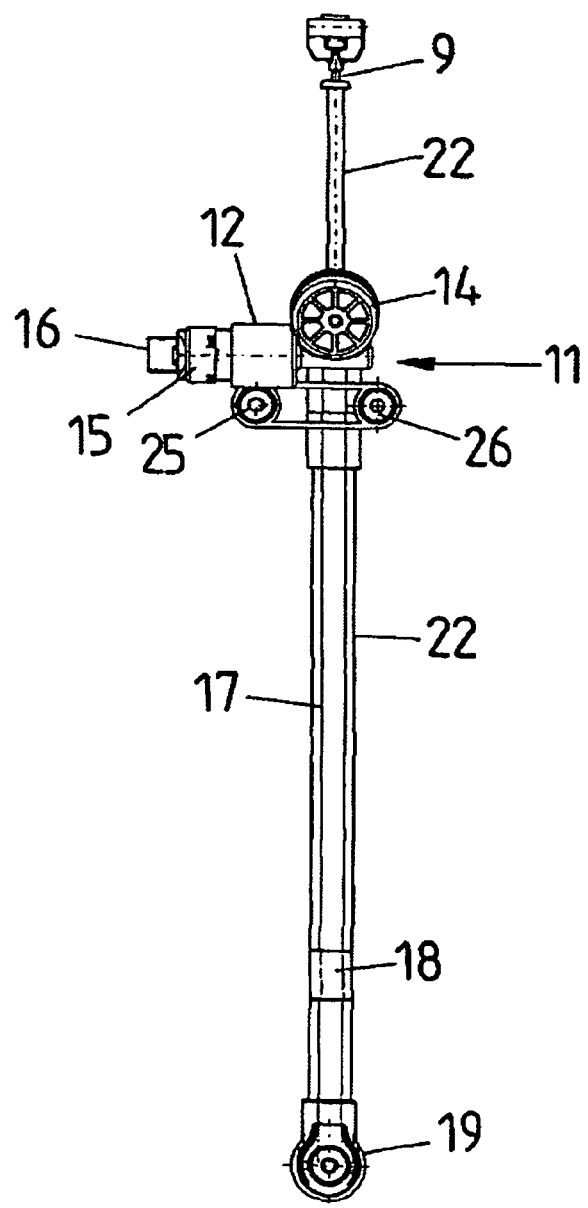
FIG. 6 shows front, side and rear views of the first adjusting device, with an arrangement of the roller blind drive.
Figure 7:
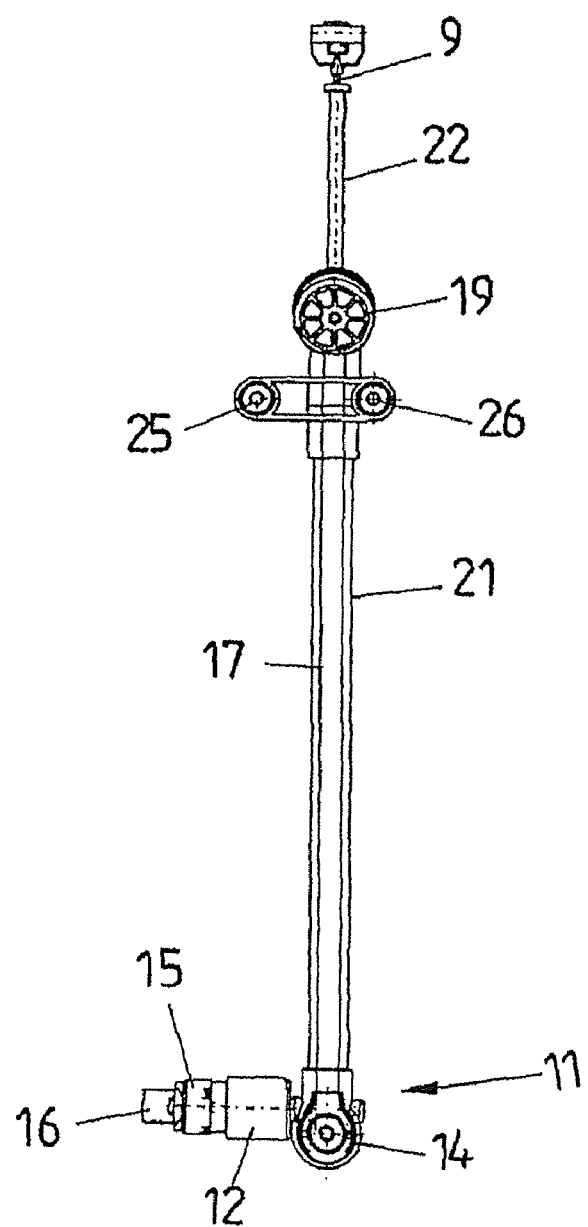
FIG. 7 shows front, side and rear views of the first adjusting device, with an other arrangement of the roller blind drive.
Figure 8:
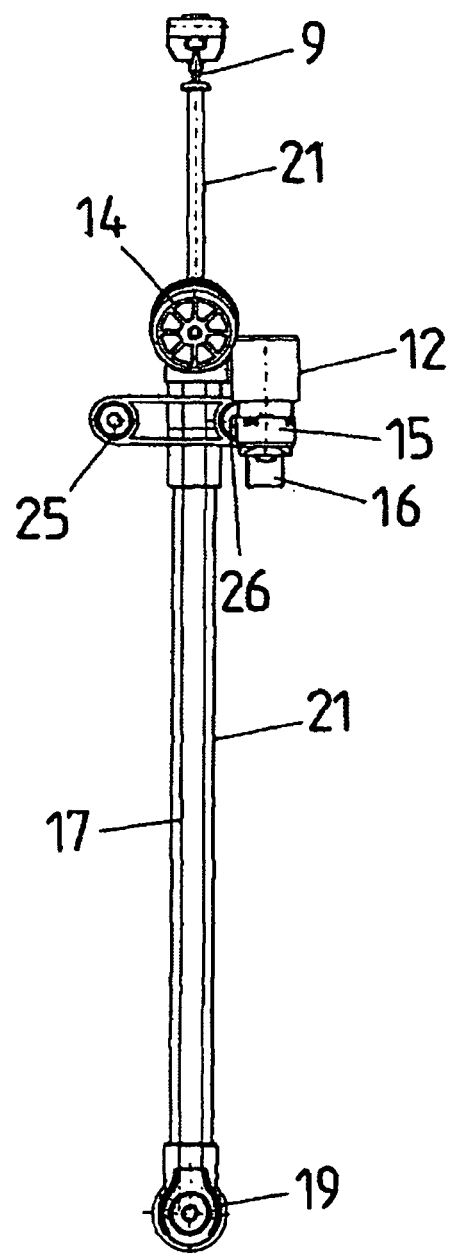
FIG. 8 shows front, side and rear views of the first adjusting device, with an other arrangement of the roller blind drive.

In addition to the different dimensioning and design of the individual module parts of the adjusting device 10, the modular system of the adjusting device 10 in particular also permits a different arrangement and alignment of the roller blind drive 11, which shall be explained by way of example with reference to the views of the adjusting device 10 illustrated in FIGS. 6 to 8.

FIG. 6 shows an adjusting device 10 with an arrangement and alignment of the roller blind drive 11 as described in the exemplary embodiment explained above on the basis of FIGS. 1 to 5.

In the arrangement in FIG. 7, the roller blind drive 11 is mounted on the lower end of the guide channel 20 or lower guide tube 21, while the roller blind cable deflector 19 is located, in an opposite arrangement, on the upper end of the lower guide tube 21.

FIG. 8 shows a variant of the arrangement of the roller blind drive 11 which corresponds to that as per FIG. 6, wherein in contrast to the arrangement as per FIG. 6, the motor, the gearing, the drive electronics and the plug are aligned not perpendicular to the profile of the guide channel 20 but parallel thereto, and the drive worm meshes in a laterally offset fashion with the worm toothing of the cable drum, such that as a result of the alignment of the toothings of the drive worm and of the worm gear with respect to one another, the worm gear can have a straight toothing.

FIG. 9 shows, in a schematically sectioned plan view, the lower section of the guide channel 20 or lower guide tube 21 with the cable deflector 19, which is arranged at the lower end and is encapsulated within a cable deflector housing 24, to illustrate the guidance of the roller blind cable 17 and of the driver 18, which is guided in the interior of the guide channel 20 or lower guide tube 21 with a positive fit perpendicular to its movement direction, for adjusting the thrust element 9.

FIG. 10 shows, in a section through the guide channel 20 or lower guide tube 21 along the line X-X, a cross-sectional shape of the guide channel 20 or guide tube 21 with the thrust element 9 arranged therein, and the cable strands 171, 172 of the roller blind cable 17 which run therein. To separate the cable strands 171, 172 of the roller blind cable 17, which, in particular as a steel cable, is usually greased, from the thrust element 9 (the problem regarding the roller blind web 6 becoming dirty as a result of the thrust element 9 guided between the roller blind web 6 and the window pane 4 has been explained above), webs or ribs 201, 202 are arranged in the interior of the guide channel 20 or of the lower guide tube 21, which webs or ribs 201, 202 extend from a wall of the guide channel 20 into the interior space thereof. The separation of the cable strands 171, 172 of the roller blind cable 17 from the thrust element 9 ensures that no dirt particles or moisture which could be transferred to the roller blind web 6 pass to the thrust element 9.

At the same time, the arrangement of the ribs or webs 201, 202 in the interior of the guide channel 20 serves for the additional guidance of the driver 18, as a result of which rattling noises are prevented and any misalignment of the driver 18 in the interior of the guide channel 20 is avoided.

FIG. 11 shows, in a section along the line XI-XI in FIG. 9, the position of the driver 18 in the interior of the guide channel 20 in connection with the arrangement of the thrust element 9 and the cable strands 171, 172 of the roller blind cable 17. It can be seen from this illustration that the driver 18 virtually completely fills the interior space of the guide channel 20 and, in incisions, receives the ribs or webs 201, 202 which protrude from a side wall of the guide channel 20 into the interior space thereof.

In addition to the cross-sectional shape of the guide channel 20 or of the lower guide tube 21 illustrated in FIGS. 10 and 11, any other desired cross-sectional shapes are also possible and can be used in the adjusting device according to the invention. Since the guide channel 20 and the lower guide tube 21 are preferably produced by means of extrusion, the cross-sectional shape can be freely selected with a large range of variation without additional expenditure, wherein the formation of the inwardly aligned ribs or webs 201, 202 does not involve any significant additional expenditure when using the extrusion technique.

Figure 12:
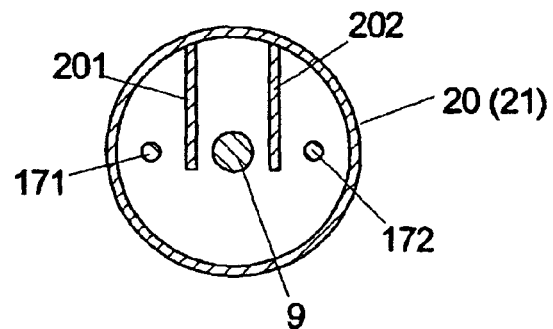
FIG. 12 shows a first variant for the cross-sectional shape of the guide channel or guide tube of the first adjusting device.

FIG. 12 shows a guide channel 20, which is circular in cross section, with likewise inwardly aligned ribs or webs 201, 202 for separating the thrust element 9 from the cable strands 171, 172 of the roller blind cable 17.

Figure 13:
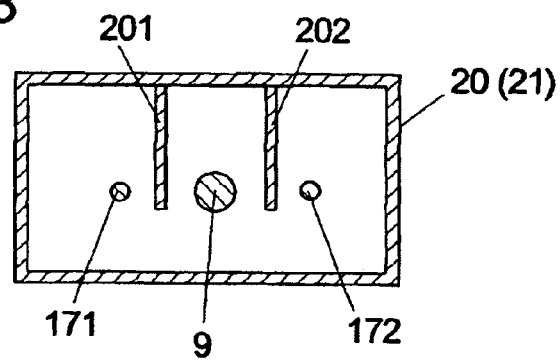
FIG. 13 shows a second variant for the cross-sectional shape of the guide channel or guide tube of the first adjusting device.

FIG. 13 shows a guide channel 20, which is rectangular in cross section, with likewise inwardly aligned ribs or webs 201, 202, with it being possible for the dimensions of the sides of the rectangular guide channel 20 to be selected arbitrarily; this includes a square cross section.

Figure 14:
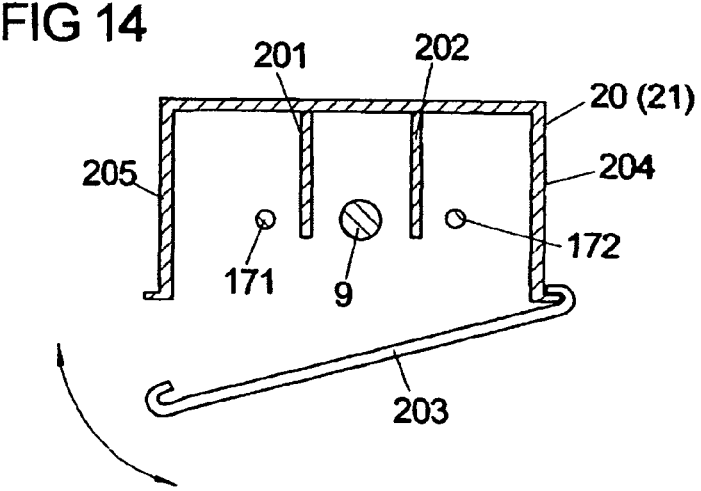
FIG. 14 shows a third variant for the cross-sectional shape of the guide channel or guide tube of the first adjusting device.

FIG. 14 shows the guide channel 20, which is rectangular in cross section, with a front wall 203 which is articulatedly connected in a hinged fashion to the one side wall 204 and which can be latched to the opposite side wall 205. As a result of the mobility of the front wall 203 and its latching to the side wall 205 in the direction of the double arrow shown in FIG. 14, the guide channel 20 can be opened for inserting the driver 18 and for other assembly and servicing work, and can be closed off again in a dust- and moisture-tight fashion.

FIGS. 15 to 31 illustrate an enhancement of the roller blind 5 described above on the basis of FIGS. 1 to 14, the adjusting device 10 of which roller blind 5 is preferably of modular design. Said enhancement of the roller 5 permits a synergetic effect by virtue of parts of a window lifter system being connected to the adjusting device 10 of the roller blind 5 as per FIG. 1, or components being provided which are utilized in common by the adjusting device 10 and by the window lifter system. The exemplary embodiments illustrated in FIGS. 15 to 31 and the following description relate to the connection of the adjusting device of a roller blind to a single-strand window lifter, but can be transferred analogously to any other desired window lifter.

An integration of the window lifter system into the adjusting device 10 of the roller blind permits, for the full utilization of the synergetic effect, a modular system in which the guide channel 20 of the adjusting device 10 of the roller blind 5 is provided regardless of whether a roller blind is installed. In this embodiment variant, the arrangement of a roller blind independently of a window lifter system, that is to say also with separately provided window lifter systems, a combination of the adjusting device of the roller blind with the window lifter system, and a sole arrangement of a window lifter system is possible, wherein in the latter case, the guide channel 20 of the roller blind remains empty, but the base plate which is provided in common for a roller blind and the window lifter system, and the common cable deflectors, can be utilized by the window lifter system as in the second case mentioned.

Figure 15:
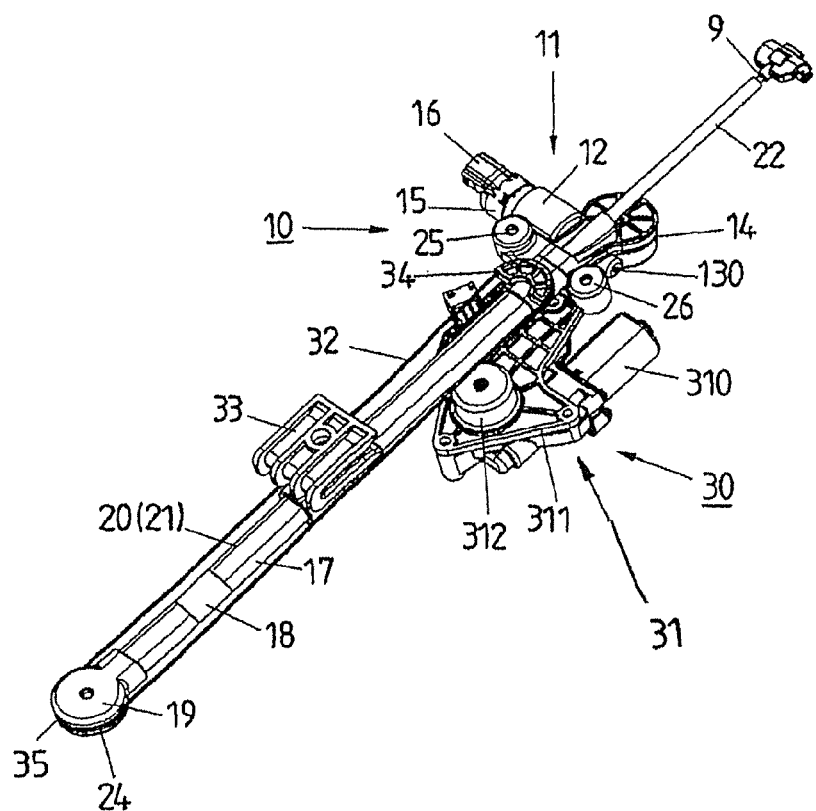
FIG. 15 shows a perspective illustration, from a first viewing direction, of a cable window lifter integrated into the first adjusting device for a roller blind.
Figure 16:
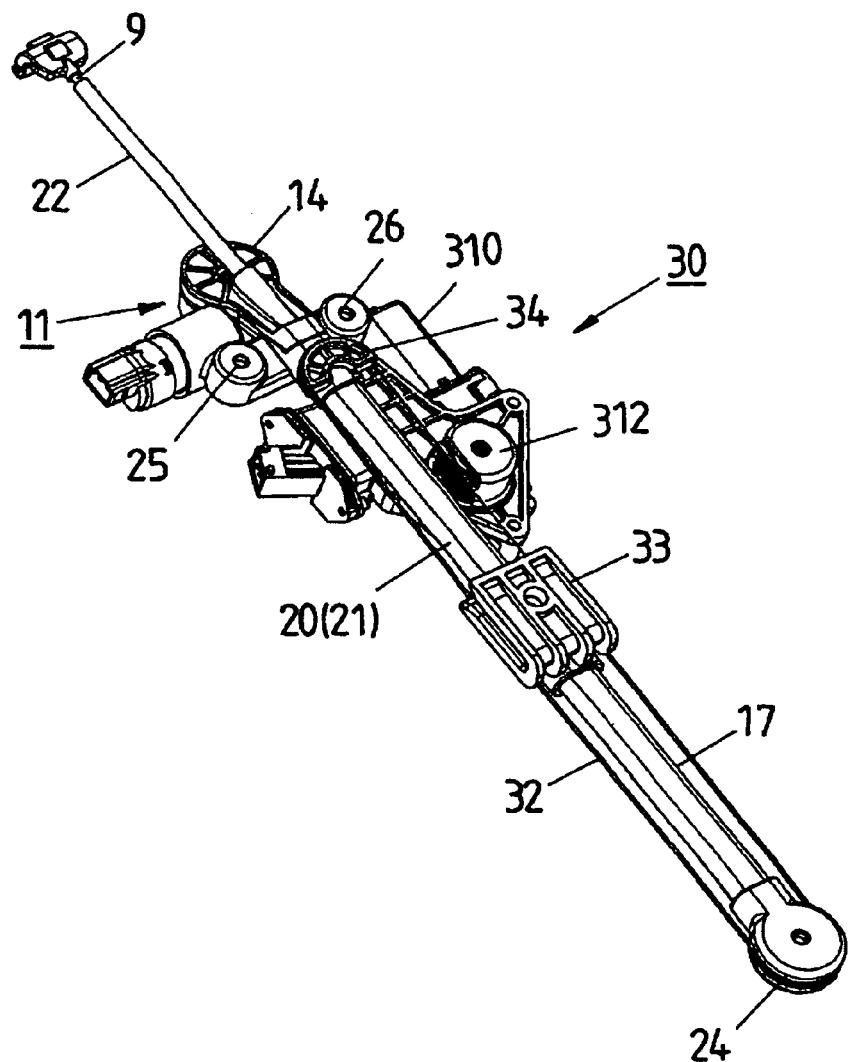

The above-described adjusting device 10 for adjusting the roller blind web 6 by means of a thrust element 9 is illustrated in FIGS. 15 and 16 in a perspective view from different viewing directions, and in FIGS. 17 to 19 in a front, side and rear view. Here, the guide channel 20 of the adjusting device 10 is partially used, or the lower guide tube 21 of said adjusting device 10 is used entirely, as a guide rail for the cable window lifter 30, which is composed of a window lifter drive 31, the guide channel 20 which is embodied as a guide rail for a window lifter driver 33, and a window lifter cable 32 and an upper and lower cable deflector 34, 35.

The window lifter drive 31 is composed of an electric motor 310, a gearing 311 and a window lifter cable drum 312, which is coupled to the output of the gearing 311, for the window lifter cable 32 which is wound in the usual way on a spiral-shaped cable groove of the cable drum 312, is guided over the upper and lower cable deflectors 34, 35, and is connected by means of a cable nipple to the window lifter driver 33.

The adjusting device 10 is constructed in the above-described way, with the roller blind drive 11 being aligned transversely with respect to the longitudinal extent of the guide channel 20 and with the cable drum 14 for holding the roller blind cable being arranged on the drive housing 23 of the adjusting device 10 at an acute angle with respect to the longitudinal extent of the guide channel 20.

The window lifter drive 31 is arranged adjacent to the roller blind drive 11, with the window lifter cable drum 312 being arranged and aligned in such a way that the one cable strand of the window lifter cable 32 is guided via a corresponding inlet to the window lifter cable drum 312. The upper cable deflector 34 of the window lifter system 30 can optionally be integrated into the housing of the window lifter drive 31 or plugged onto the housing.

To enhance the modular design of the adjusting device 10 of the (sunshield) roller blind, the window lifter drive 31 can likewise be embodied as a module or can alternatively be arranged together with the roller blind drive 11 in a common housing which encapsulates the functional elements of the window lifter system. In the modular design of the window lifter drive 31, a connection 31 is provided between the housing of the window lifter drive 31 and the housing 23 of the roller blind drive 11, such that the fastening points 25, 26 of the housing 23 of the roller blind drive 11 also serve for fastening the window lifter drive 31.

The cable deflector 19 for the roller blind cable 17 and the cable deflector 35 for the window lifter cable 32 are arranged concentrically to one another and—as can be seen in particular from the schematic plan view as per FIG. 17—are arranged in a common housing, for example the cable deflector housing 24 for the roller blind cable deflector 19, which is plugged in a dust- and moisture-tight manner onto the guide channel 20 or the lower guide tube 21 of the adjusting device 10 of the roller blind.

FIG. 20 shows, in a schematic front view, the lower part of the guide channel 20 of the adjusting device 10 of the roller blind, with the driver 18 arranged in the interior of the guide channel 20, the roller blind cable 17 and the thrust element 9, and the lower roller blind cable deflector 19 which is plugged in a dust- and moisture-tight fashion onto the lower end of the guide channel 20.

Guided on the guide channel 20 or lower guide tube 21 of the adjusting device 10 of the roller blind is the window lifter driver 33 which, for the variation of its position on the guide channel 20 or lower guide tube 21, is connected to the cable strands 321, 322 of the window lifter cable 32 which acts as a force transmission element. As can be seen from the section, illustrated in FIG. 21, along the line XXI-XXI in FIG. 20, the window lifter driver 33 has two driver pads 331, 332, between which the window pane 4 is clamped, clipped or inserted in a positively-fitting manner by means of for example a hole in the window pane 4. The driver pads 331, 332 are connected to a guide section 330 of the window lifter driver 33, which lies in a positively-fitting manner around the outer contour of the guide channel 20 or lower guide tube 21 with the thrust element 9 arranged therein and the cable strands of the roller blind cable 17. A cable nipple receptacle 333 for a cable nipple 323 of the window lifter cable 32 is formed as a part of the guide section 330. The cross-sectional illustration as per FIG. 21 also shows the two cable strands 321, 322 of the window lifter cable 32 in section.

FIG. 22 shows, in a section along the line XXII-XXII in FIG. 20, the interface for the positively-fitting connection of the roller blind driver 18, which is guided in the guide channel 20 or lower guide tube 21 with a positive fit perpendicular to its movement direction, to the thrust element 9, and the sealing between the thrust element 9 and the cable strands 171, 172 of the roller blind cable 17.

FIGS. 23 to 26 illustrate different arrangements, alignments and embodiments of the window lifter drive 31 in relation to the embodiment of the adjusting device 10 for the roller blind as per FIGS. 2 to 6, and show the possibilities for a window lifter system which is likewise of modular design.

In contrast to the arrangement of the window lifter drive 31 as per the exemplary embodiment described above, FIG. 23 shows an arrangement of the window lifter drive 31 at the lower end of the guide channel 20 which, with its outer contour, serves as a guide rail, wherein the window lifter cable drum 312 at the same time forms the lower deflector for the window lifter cable 32, while the upper window lifter cable deflector 34 is either formed as part of the roller blind drive 11 or is plugged into the drive housing 23 of the roller blind drive 11.

In the embodiment as per FIG. 24, the window lifter cable drum 312 forms the upper window lifter cable deflector 34, wherein in contrast to the embodiment of FIGS. 15 to 19, the electric motor 310 is aligned in the opposite direction, that is to say toward the lower end of the guide channel 20 or lower guide tube 21.

In the embodiment as per FIG. 25, a further synergetic effect is obtained in that a common electric motor 50 is provided both for driving the roller blind and also for driving the window lifter, the output shaft of which electric motor 50 can be coupled selectively by means of a switchover gearing 51 to the roller blind cable drum 14 or to the window lifter cable drum 312. The provision of a common electric motor 50 also makes it possible to provide common drive electronics for the adjusting device of the roller blind and also for the window lifter system, and a common plug-type connection for example for connecting to the bus system of a vehicle door.

The common drive electronics or coupling of the drive electronics for the adjusting device 10 of the roller blind and the window lifter system ensures that an adjustment of the roller blind web is possible only up to the height to which the window pane is closed. A so-called automatic operation is preferably provided, in which the roller blind is moved into the upper or lower end position only when the window pane is closed.

Figure 26:
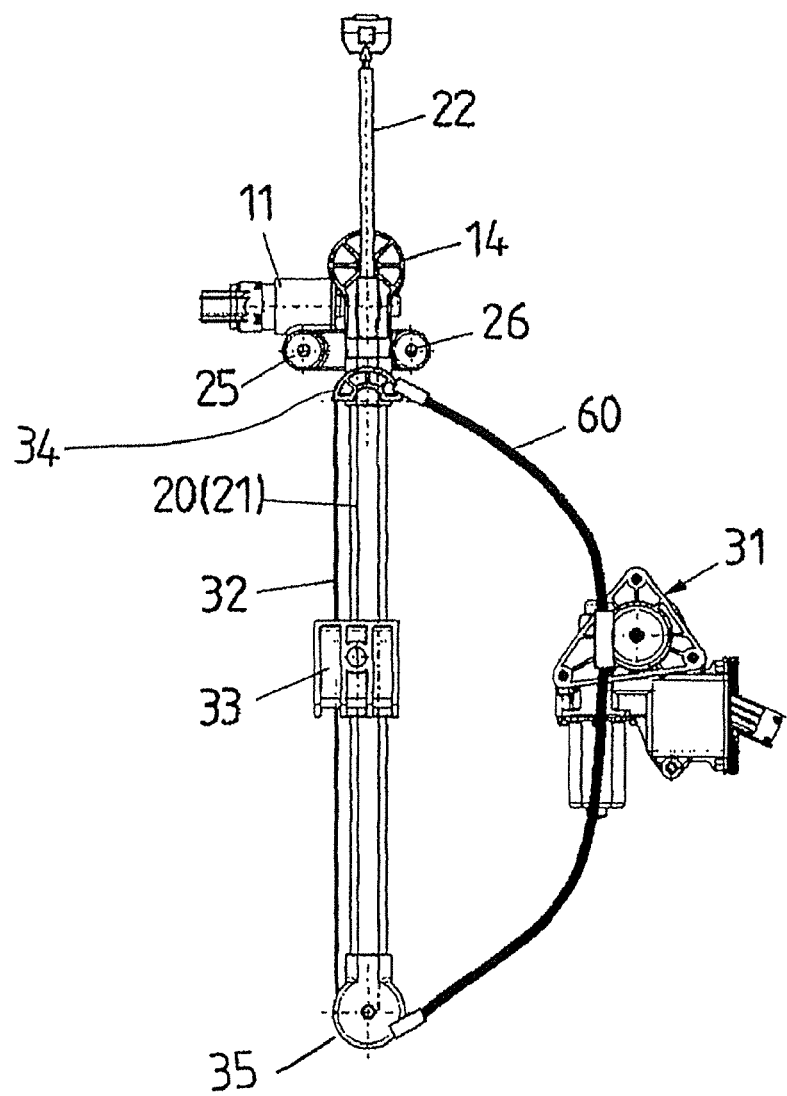
FIG. 26 shows a fourth arrangement and design of the window lifter drive.

In the embodiment as per FIG. 26, the window lifter system has a Bowden cable 60 for guiding the window lifter cable 32 to the upper and lower window lifter cable deflectors 34, 35, such that the window lifter drive 31 can be arranged separately from the adjusting device 10 for the roller blind. Said embodiment makes it possible inter alia to arrange the adjusting device 10 for the roller blind and the window lifter drive 31 separately on different mounting plates or at different points on an inner door panel of a motor vehicle door. Said embodiment also permits, for example, the arrangement of the window lifter drive 31 on the dry-space side of a motor vehicle door and the arrangement of the adjusting device 10 for the roller blind on the wet-space side of the motor vehicle door.

FIGS. 27 to 31 illustrate various embodiments for integrating a window lifter system into the adjuster device for a roller blind, wherein said illustrations should be considered merely to be exemplary and not exhaustive.

Figure 27:
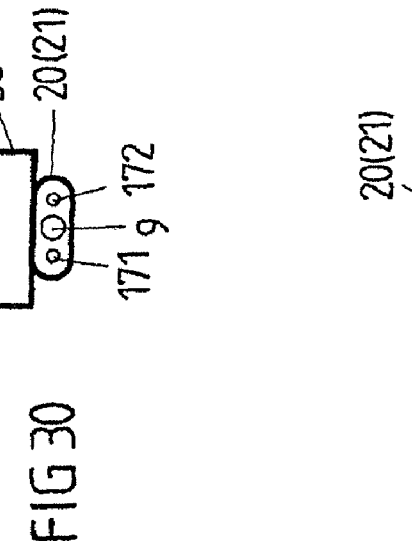
FIG. 27 shows a schematic section of the two-part arrangement and assignment of the window lifter guide rail and of the guide channel of the roller blind.

FIGS. 27 to 23 show, in a schematic cross section, a two-part design of the integration of the window lifter into the adjusting device for a roller blind, with FIG. 27 showing a separate but directly adjacent arrangement of a window lifter guide rail 36 and of the guide channel 20 of an adjusting device of the roller blind. An increase in stability and a common attachment to a base plate or mounting plate are obtained by means of mutual support of the window lifter guide rail 36 and of the guide channel 20.

Figure 28:
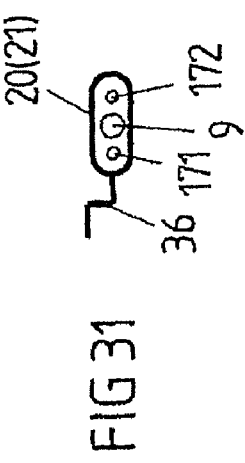
FIG. 28 shows a schematic section of the two-part arrangement and assignment of the window lifter guide rail and of the guide channel of the roller blind.

FIG. 28 shows the integration of the guide channel 20 of an adjusting device for a roller blind into a conventional guide rail, whose cavity is closed off by means of a cover 210 to form the guide channel 20, such that the thrust element 9 and the cable pulls 171, 172 of the roller blind cable are sealed off in a dust- and moisture-tight fashion. The size and embodiment of the guide channel 20 and of the window lifter guide rail 36 should be dimensioned here such that the window lifter driver is not hindered in its sliding movement along the window lifter guide rail 36.

In this embodiment, too, additional webs or ribs can prevent contact of the thrust element 9 with the cable strands 171, 172 of the roller blind cable, with the result of the thrust element 9 becoming dirty.

Figure 29:
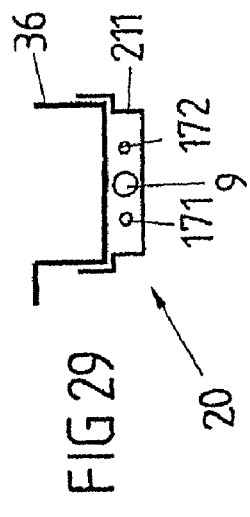
FIG. 29 shows a schematic section of the two-part arrangement and assignment of the window lifter guide rail and of the guide channel of the roller blind.

In the embodiment as per FIG. 29, the guide channel 20 for the adjusting device of the roller blind is produced by means of a cap 211 which is plugged onto the outer side of a conventional guide rail, such that the thrust element 9 and the roller blind cable 17 can be arranged in the cavity formed between the cap 211 and the outer side of the window lifter guide rail 36.

Figure 30:
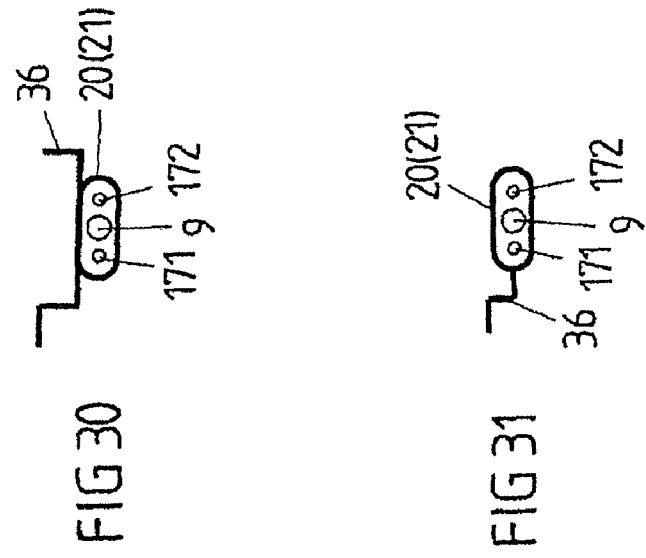
FIG. 30 shows a schematic section through a first embodiment of an integral design of the window lifter guide rail and of the guide channel of the roller blind.
Figure 31:
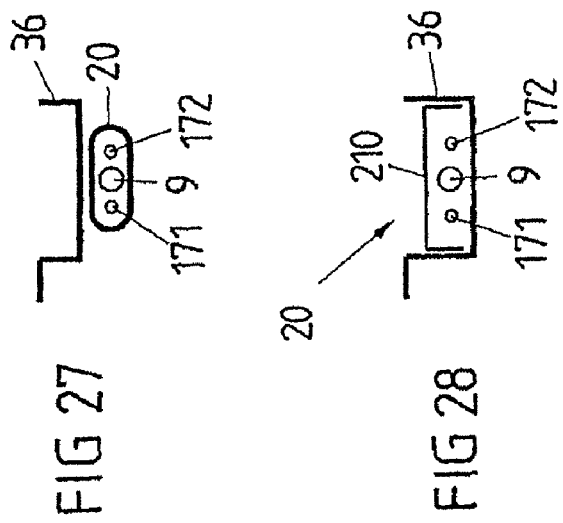
FIG. 31 shows a schematic section through a second embodiment of an integral design of the window lifter guide rail and of the guide channel of the roller blind.

FIGS. 30 to 31 illustrate the integral connection of the guide channel 20 of the adjusting device 10 for a roller blind 5 to a window lifter guide rail 36, which makes optimal use of the possible synergetic effect.

The cross section schematically illustrated in FIG. 30 corresponds to the embodiment described above on the basis of FIGS. 15 to 19, while in the variant as per FIG. 31, the guide channel 20 is formed as part of the window lifter guide rail 36, or the guide section for holding the window lifter driver is formed as a lateral projection of the guide channel 20 of the adjusting device 10 of the roller blind 5.

In these embodiments, too, ribs or webs which are additionally arranged in the interior of the guide channel 20 can provide spatial separation of the thrust element 9 from the cable strands 171, 172 of the roller blind cable, and can thereby prevent the thrust element 9, and as a result the roller blind web, from becoming dirty.

Figure 36:
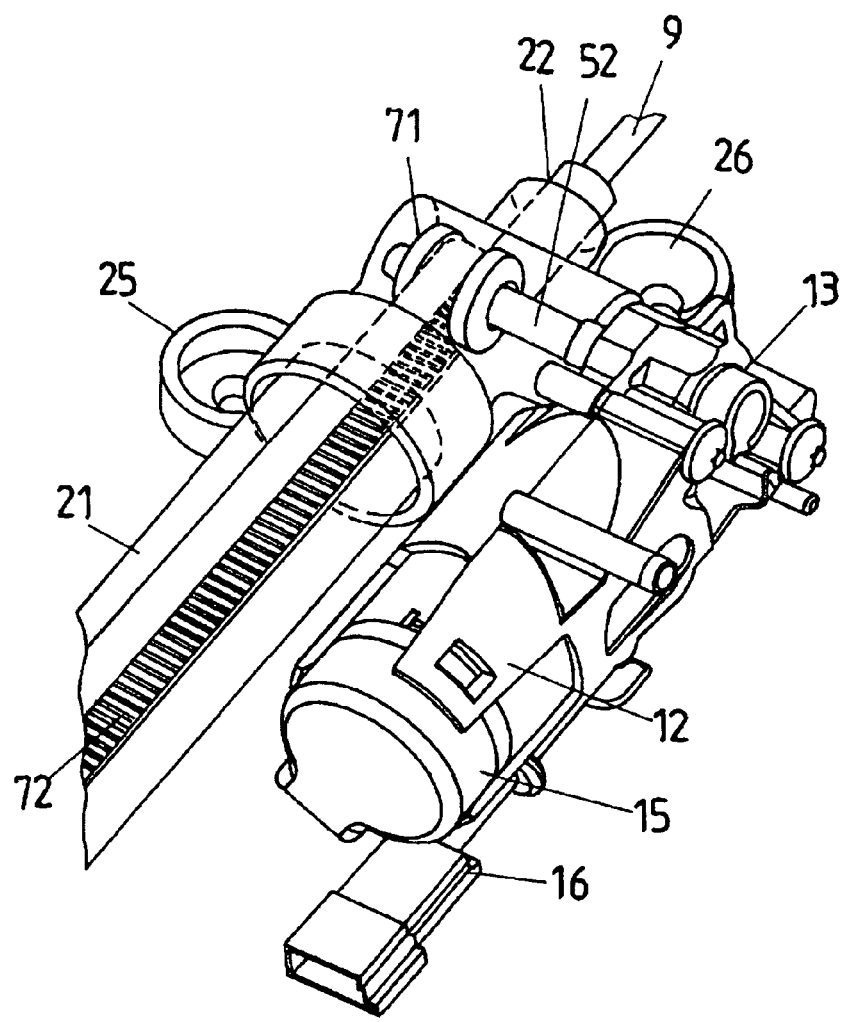
FIG. 36 shows an enlarged perspective illustration of the connection of the drive housing or head part of the second adjusting device to a guide channel or guide tube.
Figure 37:
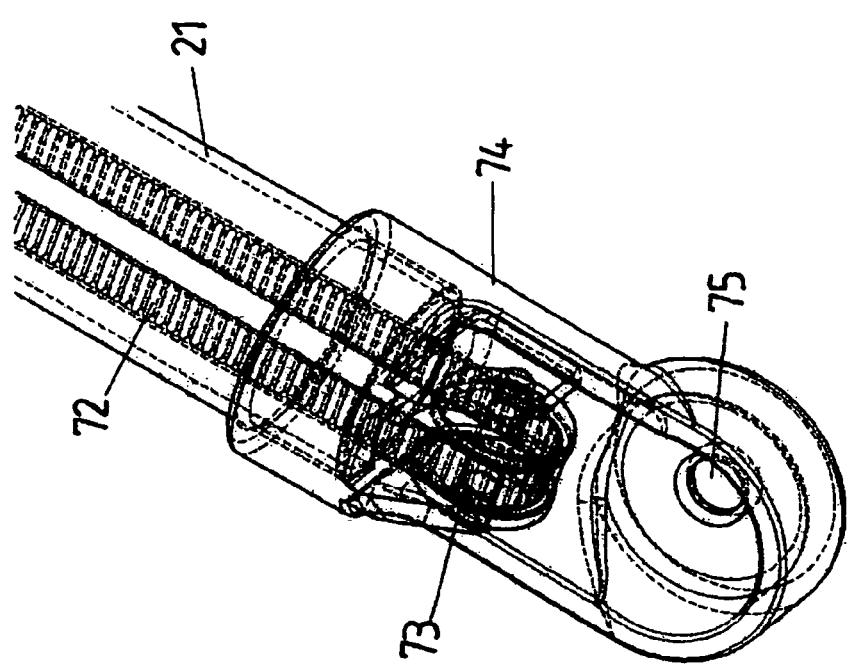
FIG. 37 shows an enlarged perspective illustration of the connection of the deflector housing of the second adjusting device to a guide channel or guide tube

The second adjusting device 10', shown in FIGS. 32 to 35 in a perspective view, a front view and a side view and a perspective detail illustration, and in FIGS. 36 and 37 in an enlarged perspective view of the upper and lower ends, for the thrust element 9 of the roller blind is likewise embodied in the manner of a single-strand cable window lifter, and in contrast to the first adjusting device 10, has a toothed belt 72 with positive-fit elements as a flexible traction means. The adjusting device 10' comprises the electromotive roller blind drive 11 which is composed of an electric motor 12, a gearing 13, drive electronics 15 and a plug 16 for connecting the roller blind drive 11 to control and regulating electronics of the motor vehicle or of the motor vehicle door, in particular to a bus system, a preferably tubular guide channel 20 with a lower guide tube 21 and an upper guide tube 22, a drive housing or head part 23, and a deflecting roller housing or foot part 74, which are connected in a dust- and water-tight fashion to the guide channel 20 or lower guide tube 21.

The toothed belt 72, which is optionally of open or closed belt design, runs in the lower guide tube 21 and, in the drive housing or head part 23, meshes by means of its toothing with the mating toothing of a drive pinion 71 which is connected by means of a driveshaft 52 to the gearing 13 of the roller blind drive 11, and with the mating toothing of a deflecting roller 73 which is arranged in the deflecting roller housing or foot part 74. The toothed belt 72 is also connected by means of its toothing in a positively-fitting manner to the mating toothing of a driver 80 which is arranged in the lower guide tube 21 and which is connected to the thrust element 9. As a result of an actuation of the roller blind drive 11 and the resulting rotation of the drive pinion 71 in the one or other rotational direction, the toothed belt 72 is rotated in the same rotational direction about the drive pinion 81 and the deflecting roller 73, such that the driver 80 is moved toward the head part 23 or away from the head part 23 and the thrust element 9 is thereby moved out of the lower guide tube 21 or into the lower guide tube 21.

The second adjusting device 10' with a toothed belt 72 as a flexible traction means with positive-fit elements can, similarly to the first adjusting device 10 with a roller blind cable as a flexible traction means, have an at least partially open guide channel 20 which is open and preferably slotted at least over a part of its periphery, such that parts of a driver 18 which is arranged for adjusting the thrust element 9 in the guide channel 20 engage through the slot of the guide channel 20 and are connected to additional parts or can actuate end position sensors, position measuring elements or the like. For dust- and moisture-tight sealing, it is possible to provide a corresponding seal which allows parts of the adjusting device 10 to extend through the guide channel 20 and which likewise keeps the interior space of the guide channel 20 free from dirt particles and moisture.

The thrust element 9 is guided in a likewise encapsulated fashion in the upper guide tube 22 and the deflecting roller 73 is encapsulated by the deflecting roller housing 74, with the connection of the deflecting roller housing or foot part 74 and of the drive housing or head part 23 to the lower guide tube 21 or to the guide channel 20 preferably being of dust- and water-tight design. The length of the upper guide tube 22 or of the guide channel 20 which is guided out of a bush of the drive housing or head part 23 is dimensioned such that the thrust element 9 projects out of the inner door lining, or wet/dry space partition of the vehicle body, from its end which is connected to the roller blind pull rod 8.

It is alternatively possible for an encapsulation of only the lower guide tube 21 to be provided, while the upper guide tube 22 serves merely as a longitudinal guide for the thrust element 9. The upper guide tube 22 can also be omitted entirely and it is self-evident that the upper guide tube 22, even in encapsulated form, holds the thrust element 9 completely up to the transverse connection to the roller blind pull rod 8 only in the retracted state, while the only partially or completely deployed thrust element 9 is also situated only partially in the encapsulated state within the lower guide tube 21 and upper guide tube 22 or in the upper guide tube 22.

For the fastening of the adjusting device 10' to a base plate or mounting plate or to the inner door panel of the motor vehicle door 1, the adjusting device 10' has, on the drive housing or head part 23, two fastening points 25, 26 which are situated opposite one another with respect to the guide channel 20, and the deflecting roller housing 74 has a fastening bore 75 for leading through a fastening means which is in particular connected to the inner door panel of the motor vehicle door 1.

FIG. 36 shows, in an enlarged perspective illustration, the adjusting device 10' in the region of the roller blind drive 11 with the electric motor 12, the gearing 13, the driveshaft 52, the drive pinion 71 which meshes with the toothed belt 72, the drive electronics 15 and the plug 16 for the electrical connection of the drive electronics 15 in particular to a bus system of the motor vehicle door 1. The enlarged illustration clearly shows the dust- and moisture-tight connection of the lower guide tube 21 to the drive housing or head part 23 and the fastening points 25, 26 thereof. While the upper guide tube 22 is only of short design and is aligned as a rectilinear elongation of the lower guide tube 21, the driveshaft 52 and the drive pinion 71 which meshes with the toothed belt 72 are aligned perpendicular to the lower guide tube 21.

FIG. 37 shows, in a likewise enlarged perspective illustration, the adjusting device 10' at the lower end of the guide tube 21 which is connected by means of a dust- and water-tight plug-type connection to the deflecting roller housing or foot part 74, in which are arranged the toothed belt deflector with the deflecting roller 73 arranged in the deflecting roller housing 74, and the fastening bore 75 for connecting the adjusting device 10' in the lower region of the guide tube 21 to, for example, the inner door panel of the motor vehicle door 1.

The adjusting elements, which can be connected to one another by means of plug-type connections, of the adjusting device 10', specifically the roller blind drive 11 which is arranged in the drive housing or head part 23, the preferably tubular guide channel 20 which can be composed of a lower and upper guide tube 21, 22 or can be of continuous design, and the deflecting roller 73 which is arranged in the deflecting roller housing 74, form individual modules of a modular system, which permits the connection of different materials, different sizes of the individual modules and different installation locations in a motor vehicle body or motor vehicle door. For example, different lengths of the guide channel 20 or of the lower guide tube 21 permit the use of the adjusting device 10' in different motor vehicle doors, the use of different roller blind drives 11 makes it possible to provide different levels of power, and different lengths of the upper guide tube 22 or of the guide channel 20 to the point of the upper guide tube 22 being omitted, or a corresponding length of the guide channel 20 to the roller blind drive 11, permits the use of the adjusting device 10' in the wet space or in the dry space of a motor vehicle door.

In the wet-space embodiment of the modular adjusting device 10', the length of the upper guide tube 22 or the length of the guide channel 20 in its integral design is dimensioned such that the adjusting device 10' is encapsulated over its entire length, such that no dust or moisture can penetrate into the encapsulated system of the adjusting device 10'. To stabilize the position of the guide channel 20 or upper guide tube 22, the upper end of the latter which is situated opposite the roller blind drive 11 is plugged through a water-tight tube leadthrough, which is matched to the cross-sectional shape of the guide channel 20 or upper guide tube 22, in the wet/dry space partition of the motor vehicle door, in particular in the inner door panel of the motor vehicle door.

The upper guide tube 22 or the upper end of the continuous guide channel 20 can optionally also be clipped to the inner door lining or to the inner door panel to provide secure fastening of the guide channel 20 or upper guide tube 22.

Figure 38:
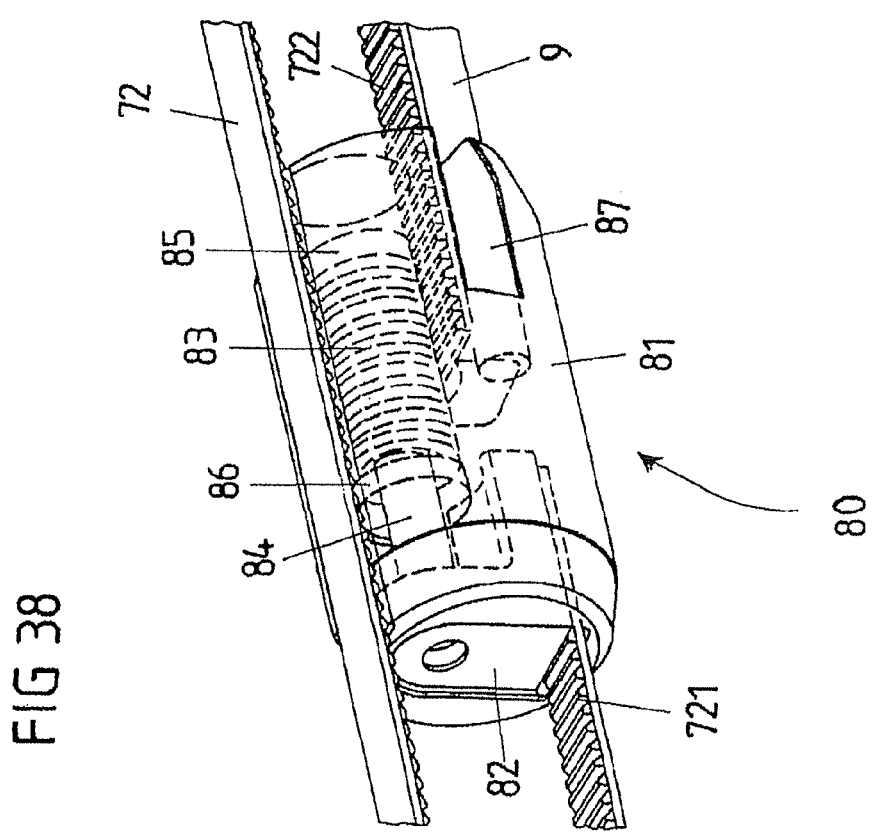
FIG. 38 shows a perspective and partially sectioned illustration of a roller blind driver with a length compensation device for an open toothed belt.
Figure 39:
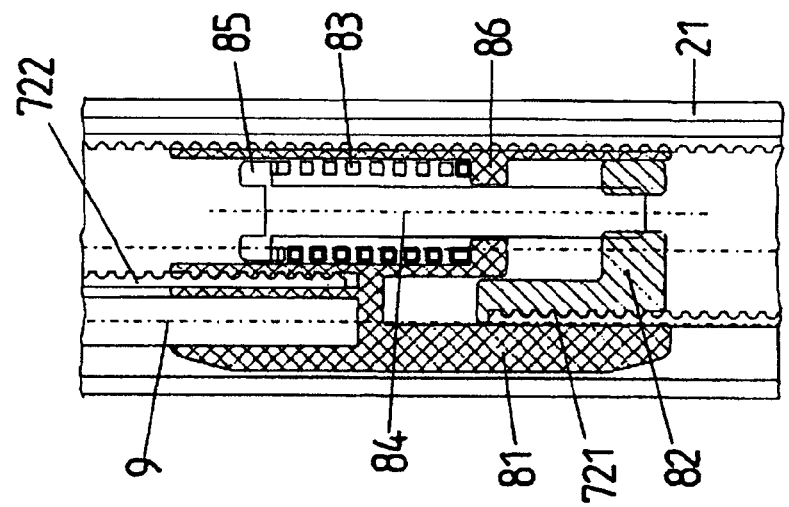
FIG. 39 shows a longitudinal section through the roller blind driver as per FIG. 38.
Figure 42:
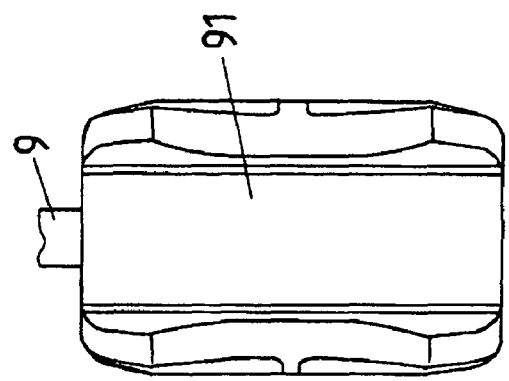
FIG. 42 shows a rear view of a roller blind driver with positive-fit elements for holding a toothed belt, with a closed belt design.
Figure 40:
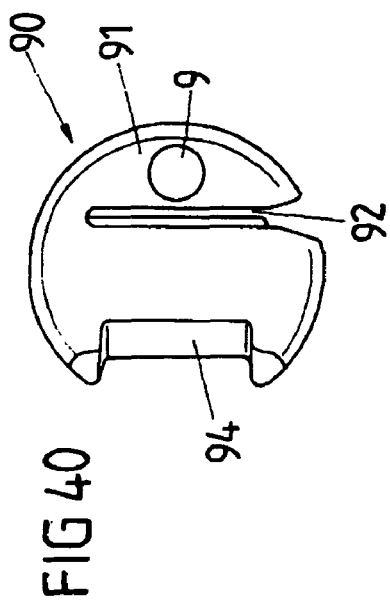
FIG. 40 shows a plan view of a roller blind driver with positive-fit elements for holding a toothed belt, with a closed belt design.
Figure 41:
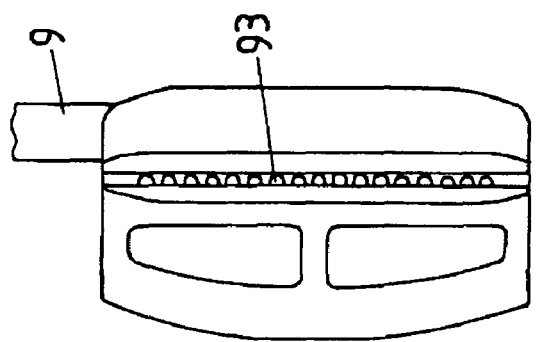
FIG. 41 shows a side view of a roller blind driver with positive-fit elements for holding a toothed belt, with a closed belt design.
Figure 44:
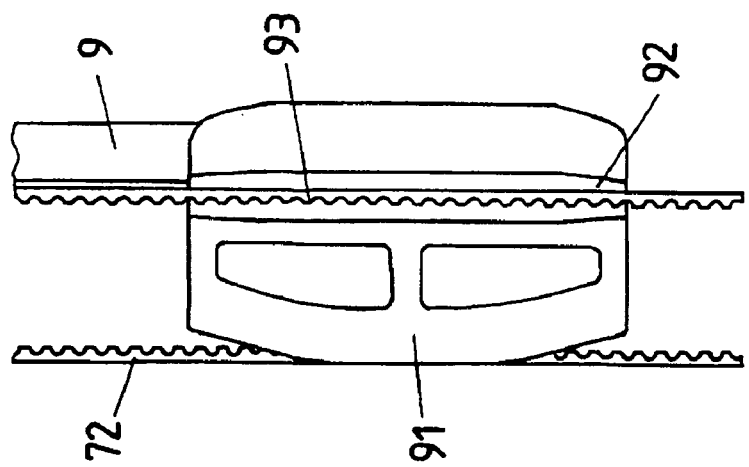
Figure 43:
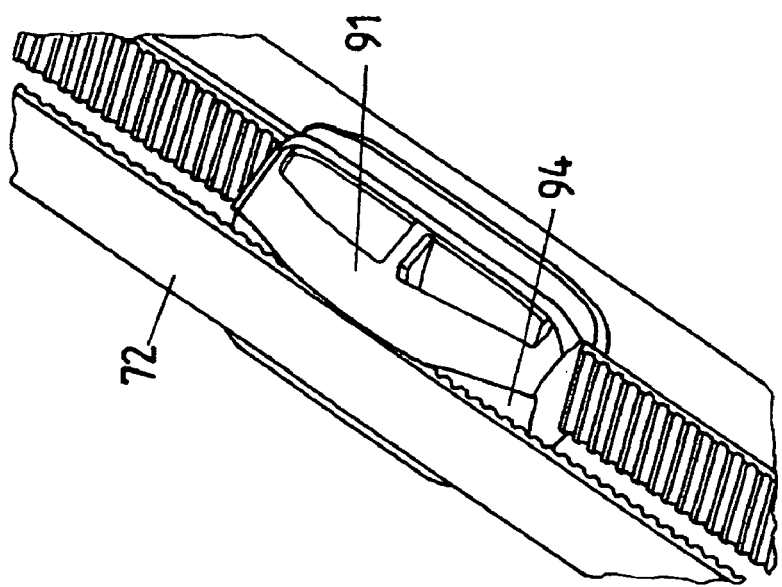
FIG. 43 shows a perspective view of the roller blind driver, which is connected to a toothed belt, as per FIGS. 40 to 42.

FIG. 38 shows, in an enlarged perspective illustration, and FIG. 39 shows, in a longitudinal section, the driver 80, which is guided in the lower guide tube 21, for connecting the toothed belt 72 to the thrust element 9. The toothed belt 72 has an open belt design, the ends 721, 722 of which are joined together in the driver 80 and are connected in a positively-fitting manner by means of their toothing to the mating toothing of the driver 80. A length compensation device which is integrated into the driver housing 81 serves to provide length compensation of the toothed belt 72 in the event of changing toothed belt lengths as a result of the tensile forces exerted on the toothed belt 72, which length compensation device comprises a driver carriage 82, which is connected to the one end 721 of the toothed belt and is guided in a sliding fashion in the driver housing 81, a spring pin 84 which is connected to the driver carriage 82, and a pressure spring 83 which is arranged between a spring support 86 on the driver housing 81 and the spring pin head 85. The pressure force exerted by the pressure spring 83 on the spring pin head 85 and the spring support 86 seeks to move the driver carriage 82, with the one end 721 of the toothed belt 72 clamped in the driver carriage 82, to the other end 722 of the toothed belt 72, which is likewise connected in a positively-fitting manner by means of a mating toothing to the driver housing 81.

A bracket 87 serves to connect the thrust element 9 to the driver 80, which bracket 87 is designed as a positively-fitting or force-fitting connection.

For the connection of a toothed belt 72 of closed belt design to the thrust element 9, FIGS. 40 to 44 illustrate a driver 90 which, in a driver housing 91, has a toothed belt holding slot 92 with a mating toothing 93 formed therein as mating positive-fit element to the positive-fit elements of the toothed belt 72, and a bore for receiving the cylindrical thrust element 9. A recess 94 is aligned parallel to the toothed belt holding slot 92 and serves for guiding the mating strand of the toothed belt 72 on the driver 90 or for guiding the mating strand of the toothed belt 72 past the driver 90 in a space-saving fashion.

Figure 45:
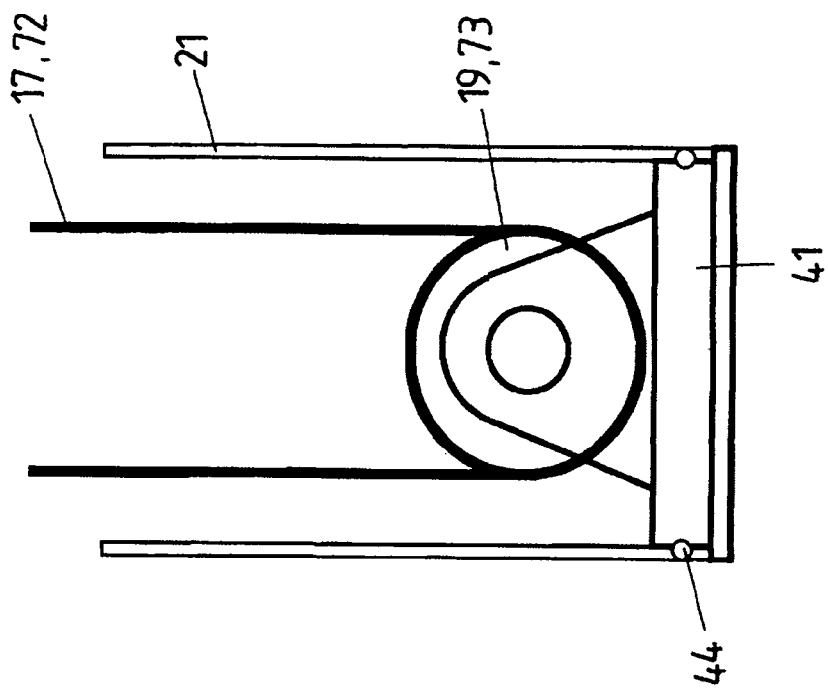
FIG. 45 shows a schematic section through the lower end of a guide tube or guide channel in the region of the traction means deflection with a sealed closure cover.

FIG. 45 illustrates, in a schematic section illustration, the lower end of the first or second adjusting device 10, 10' in the region of the deflecting device for the flexible traction means, which deflecting device is embodied either as a roller blind cable deflector 19 for a roller blind cable 17, as a V-belt roller for a V-belt, or as a deflecting roller 73 for a toothed belt 72, punched belt or a chain. For closing off the lower guide tube 21 in a dust- and water-tight fashion, a closure cover 41 is provided which is additionally sealed off with respect to the end of the lower guide tube 21 by means of an O-ring seal 44.

Figure 46:
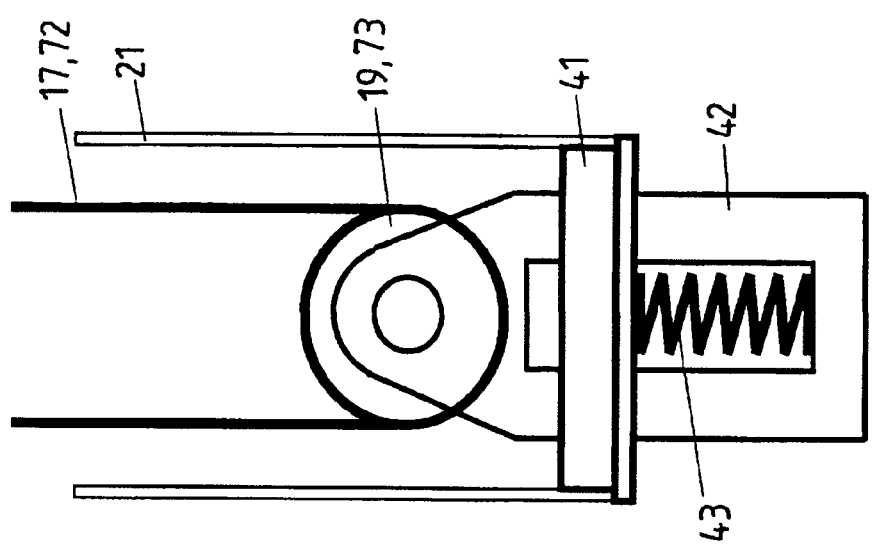
FIG. 46 shows a schematic section through the lower end of a guide tube or guide channel in the region of the traction means deflection with a traction means tensioning device.

In order to ensure length compensation of the flexible traction means even in the case of sealing of the lower guide tube 21 by means of a closure cover 41 as per FIG. 45, and independently of the embodiment of the flexible traction means of open or closed design, FIG. 46 illustrates, in a schematic longitudinal section through the lower end of the adjusting device 10 or 10', a traction means tensioning device which is composed of a tensioning lever 4 which is connected to the traction means deflector 19, 73 and which is supported by means of a tensioning spring 43 on the closure cover 41.

The invention claimed is:

1. A vehicle roller blind or a sunshield roller blind for motor vehicles comprising a roller blind web connected to a thrust element, wherein the thrust element is at least one of rigid in compression and bending-resistant, for tensioning the roller blind web, and an adjusting device configured to actuate the thrust element, wherein the adjusting device has a flexible traction device and is at least partially encapsulated together with the thrust element, wherein the thrust element and the adjusting device are arranged in a housing which holds the thrust element and the adjusting device in a dust-tight and moisture-tight connection and wherein the housing comprises a drive housing for a roller blind drive and a guide channel which holds the thrust element and the flexible traction device.

2. The roller blind of claim 1, wherein the flexible traction device comprises one of a toothed belt, punched belt, friction belt, a V-belt, and a chain.

3. The roller blind of claim 1, wherein the roller blind drive has an electric motor connected to drive electronics, and a gearing with a driveshaft connected to a traction device drive element, embodied as a drive pinion having positive-fit elements which engage into the mating positive-fit elements of the flexible traction device which is embodied as one of a toothed belt, punched belt, friction belt and chain.

4. The roller blind of claim 1, wherein the guide channel is tubular.

5. The roller blind of claim 1, wherein the guide channel is open, at least over a part of the periphery and the length of the guide channel.

6. The roller blind of claim 5, wherein the guide channel is slotted at least over a part of the periphery and the length of the guide channel.

7. The roller blind of claim 1, wherein the flexible traction device is configured to transmit a force to the thrust element, the adjusting device further comprising a traction device drive element which is connected to the roller blind drive and which adjusts the flexible traction device in a direction which causes the thrust element to be raised or lowered, and a traction device deflector at at least one end of an adjustment path of the thrust element, wherein a section of the flexible traction means is guided on the traction device deflector.

8. The roller blind of claim 7, wherein the traction device deflector is arranged in the guide channel.

9. The roller blind of claim 7, wherein at least one of the traction device drive element and the traction device deflector is connected with a traction device tensioning device to the guide channel, wherein the traction device tensioning device comprises a tensioning lever connected to the traction device deflector and supported on a closure cover via a tensioning spring.

10. The roller blind of claim 7, wherein the flexible traction device and the thrust element are connected to a roller blind driver guided in the guide channel with a positive fit perpendicularly with respect to a movement direction, wherein the roller blind driver comprises a device for adjusting the flexible traction device, wherein the device comprises two driver elements which are adjustable counter to one another in the movement direction of the roller blind driver and wherein each driver element is connected to a corresponding end of the flexible traction device.

11. The roller blind of claim 10, wherein the roller blind driver has positive-fit elements which are connected to mating positive-fit elements of the flexible traction device.

12. The roller blind of claim 7, wherein the drive housing comprises the traction device drive element and wherein the traction device deflector is arranged in a traction device deflector housing.

13. The roller blind of claim 12, wherein the connection of the traction device deflector housing to the guide channel is a moisture-tight and a dust-tight connection.

14. The roller blind of claim 13, wherein the connection of the drive housing and of the traction device deflector housing to the guide channel is a plug-type connection.

15. A vehicle roller blind or a sunshield roller blind for motor vehicles comprising a roller blind web connected to a thrust element, wherein the thrust element is at least one of rigid in compression and bending-resistant, for tensioning the roller blind web, and an adjusting device configured to actuate the thrust element, wherein the adjusting device has a flexible traction device and is at least partially encapsulated together with the thrust element, wherein the thrust element and the adjusting device are arranged in a housing which holds the thrust element and the adjusting device, wherein the housing comprises a drive housing for a roller blind drive and a guide channel which holds the thrust element and the flexible traction device, and wherein the guide channel runs from a lower articulation connected to the vehicle body to a partition of a wet and dry space of the vehicle body.

16. A vehicle roller blind or a sunshield roller blind for motor vehicles comprising a roller blind web connected to a thrust element, wherein the thrust element is at least one of rigid in compression and bending-resistant, for tensioning the roller blind web, and an adjusting device configured to actuate the thrust element, wherein the adjusting device has a flexible traction device and is at least partially encapsulated together with the thrust element, wherein the thrust element and the adjusting device are arranged in a housing which holds the thrust element and the adjusting device, wherein the housing comprises a drive housing for a roller blind drive and a guide channel which holds the thrust element and the flexible traction device, wherein the flexible traction device is configured to transmit a force to the thrust element, the adjusting device further comprising a traction device drive element which is connected to the roller blind drive and which adjusts the flexible traction device in a direction which causes the thrust element to be raised or lowered, and a traction device deflector at at least one end of an adjustment path of the thrust element, wherein a section of the flexible traction means is guided on the traction device deflector, wherein the guide channel comprises an upper guide tube which holds the thrust element and which runs from the drive housing or the traction device deflector to a partition of a wet and dry space of the vehicle body, and a lower guide tube which holds the thrust element, the roller blind driver and the flexible traction device, and wherein the lower guide tube runs from the drive housing or the traction device deflector to the lower articulation of the adjusting device to the vehicle body.

17. The roller blind of claim 16, wherein parts of a window lifter, which is arranged in a vehicle door, are integrated into parts of the adjusting device.

18. The roller blind of claim 17, wherein the adjusting device of the roller blind and the window lifter have common deflecting devices.

19. The roller blind of claim 17, wherein a window lifter drive is arranged at the lower end of the guide channel, wherein an outer contour of the guide channel, serves as a guide rail, wherein a window lifter cable drum forms a lower deflector for the window lifter cable, and wherein an upper window lifter cable deflector is one of formed as a part of the roller blind drive and is plugged into the drive housing of the roller blind drive.

20. The roller blind of claim 17, wherein a window lifter cable drum forms an upper window lifter cable deflector and wherein an electric motor of a window lifter drive is aligned toward a lower end of the guide channel or lower guide tube.

21. The roller blind of claim 17, wherein a common electric motor for the adjusting device of the roller blind and for the window lifter is provided, and includes a switchover gearing which can be switched over for driving at least one of a window lifter cable drum and the adjusting device of the roller blind.

22. The roller blind of claim 17, wherein webs or ribs are arranged in the lower guide tube, wherein the webs or ribs run in a longitudinal direction of said lower guide tube and separate the thrust element from cable strands of the roller blind cable and form a part of a positive-fit guide of the roller blind driver.

23. The roller blind of claim 17, wherein the lower guide tube is one of integrally connected to a guide rail of the window lifter and is embodied as a guide rail of the window lifter and wherein a window lifter driver is guided on an outer contour of the lower guide tube.

24. The roller blind of claim 23, wherein the lower guide tube and the guide rail of the window lifter are formed in two parts and are arranged adjacent to one another so as to run parallel to one another.

\* \* \* \* \*